US012433574B2

(12) United States Patent
Kennedy, II

(10) Patent No.: US 12,433,574 B2
(45) Date of Patent: Oct. 7, 2025

(54) LOCKING FORCEPS

(71) Applicant: Cook Medical Technologies LLC, Bloomington, IN (US)

(72) Inventor: Kenneth C. Kennedy, II, Clemmons, NC (US)

(73) Assignee: COOK MEDICAL TECHNOLOGIES LLC, Bloomington, IN (US)

( * ) Notice: Subject to any disclaimer, the term of this patent is extended or adjusted under 35 U.S.C. 154(b) by 922 days.

(21) Appl. No.: 17/588,886

(22) Filed: Jan. 31, 2022

(65) Prior Publication Data

US 2022/0151596 A1 May 19, 2022

Related U.S. Application Data

(60) Continuation-in-part of application No. 16/900,037, filed on Jun. 12, 2020, now Pat. No. 11,446,014,
(Continued)

(51) Int. Cl.
A61B 17/29 (2006.01)
A61B 10/04 (2006.01)
A61B 10/06 (2006.01)

(52) U.S. Cl.
CPC .............. *A61B 10/06* (2013.01); *A61B 10/04* (2013.01); *A61B 17/29* (2013.01);
(Continued)

(58) Field of Classification Search
CPC ......... A61B 10/04; A61B 10/06; A61B 17/29; A61B 2017/2936; A61B 2017/2939; A61B 2017/2941; A61B 2017/2946
(Continued)

(56) References Cited

U.S. PATENT DOCUMENTS 5,478,350 A 12/1995 Kratsch et al.
5,490,819 A 2/1996 Nicholas
(Continued)

FOREIGN PATENT DOCUMENTS

DE 202007009165 U 6/2007
DE 102015100945 A 1/2015
(Continued)

OTHER PUBLICATIONS

Extended European Search Report regarding EP 23 154 337.2 dated Jun. 26, 2023.
(Continued)

*Primary Examiner* — Eduardo C Robert
*Assistant Examiner* — David C Comstock
(74) *Attorney, Agent, or Firm* — Vivacqua Crane, PLLC

(57) ABSTRACT

A forceps may include: a housing defining an internal passageway and a longitudinal axis extending between proximal and distal ends of the housing; a first jaw and a second jaw each slidably and pivotably connected to the housing, where the first and second jaws have an open configuration and a closed configuration; a first connection member having a first end pivotably connected to the first jaw; a second connection member having a first end pivotably connected to the second jaw; a connecting pin assembly that slidably and pivotably connects the first and second jaws to the housing; and a driver operably connected to a second end of the first connection member and a second end of the second connection member. Longitudinal movement of the driver in a proximal direction relative to the housing moves the first and second jaws, along with the connecting pin assembly, relative to the housing.

20 Claims, 21 Drawing Sheets

Related U.S. Application Data which is a division of application No. 15/260,676, filed on Sep. 9, 2016, now Pat. No. 10,716,546.

(60) Provisional application No. 62/218,782, filed on Sep. 15, 2015.

(52) U.S. Cl.
CPC ............... *A61B 2017/2936* (2013.01); *A61B 2017/2939* (2013.01); *A61B 2017/2941* (2013.01); *A61B 2017/2946* (2013.01)

(58) Field of Classification Search
USPC .......................................... 600/52, 204, 205
See application file for complete search history.

(56) References Cited

U.S. PATENT DOCUMENTS

| | | | |
|---|---|---|---|
| 5,849,022 A | | 12/1998 | Sakashita |
| 5,968,074 A | | 10/1999 | Prestel |
| 6,083,150 A | | 7/2000 | Aznoian |
| 7,494,501 B2 * | | 2/2009 | Ahlberg ............... A61B 17/29 606/207 |
| 7,775,989 B2 | | 8/2010 | Nakao |
| 2006/0258954 A1 | | 11/2006 | Timberlake et al. |
| 2009/0259248 A1 | | 10/2009 | Ganter |
| 2011/0301637 A1 | | 12/2011 | Kerr |
| 2011/0319888 A1 | | 12/2011 | Mueller |
| 2012/0029507 A1 | | 2/2012 | Kimura et al. |
| 2012/0053405 A1 * | | 3/2012 | Sugita ............... A61B 18/1445 600/106 |
| 2012/0165863 A1 | | 6/2012 | McLawhorn |
| 2012/0172868 A1 * | | 7/2012 | Twomey ............ A61B 18/1445 606/41 |
| 2012/0303025 A1 | | 11/2012 | Garrison |
| 2013/0138102 A1 | | 5/2013 | Twomey |
| 2013/0218199 A1 | | 8/2013 | Kerr |
| 2014/0236178 A1 | | 8/2014 | Hyodo |
| 2016/0345993 A1 | | 12/2016 | Fry |
| 2020/0054309 A1 | | 2/2020 | Krzyzanowski |
| 2020/0297331 A1 | | 9/2020 | Adkisson et al. |
| 2021/0186545 A1 | | 6/2021 | Russo et al. |

FOREIGN PATENT DOCUMENTS

| | | |
|---|---|---|
| JP | 58-010716 U1 | 7/1956 |
| JP | 2014-505520 A | 3/2014 |
| WO | WO 96/02193 A1 | 2/1996 |
| WO | WO 98/57585 A1 | 12/1998 |
| WO | WO 01/28427 A1 | 4/2001 |
| WO | WO 2010/104755 A1 | 9/2010 |
| WO | WO 2017/048594 A1 | 3/2017 |

OTHER PUBLICATIONS

First Notice Informing the Applicant of The Communication of the International Application regarding PCT/US2016/050878 dated Apr. 20, 2017, 1 page.
Second and Supplementary Notice Informing the Applicant of the Communication of the International Application regarding PCT/US2016/050878 dated Jan. 18, 2018, 1 page.
PCT International Preliminary Report on Patentability regarding PCT/US2016/050878 dated Mar. 29, 2018, 9 pages.
First Australian Examination Report regarding Appl. No. 2016323018 dated Jun. 7, 2018, 10 pages.
Second Australian Examination Report regarding Appl. No. 2016323018 dated Jan. 15, 2019, 10 pages.
Australian Notice of Acceptance of Patent Application regarding Appl. No. 2016323018 dated May 15, 2019, 46 pages.
Canadian Examiner's Report regarding 2,998,539 dated Feb. 19, 2020, 4 pages.
Canadian Notice of Allowance regarding Appl. No. 2,998,539 dated Mar. 5, 2021, 1 page.
Chinese Office Action regarding 201680060670.X dated Nov. 16, 2020, 1 page.
European Office Action regarding App. No. 167674 76.1 dated May 11, 2018, 1 page.
European Examination Report regarding App. No. 167674 76.1 dated Dec. 14, 2020, 5 pages.
Japanese Office Action regarding Appl. No. 2018-513583 dated Jan. 8, 2020, 2 pages.
Japanese Notice of Grant regarding Appl. No. 2018-513583 dated Sep. 16, 2020, 3 pages.
Japanese Office Action mailed Mar. 26, 2019 in Japanese Application No. 2018-513583.
International Search Report and Written Opinion for PCT/US2016/050878, dated Dec. 5, 2016, 14 pp.

* cited by examiner

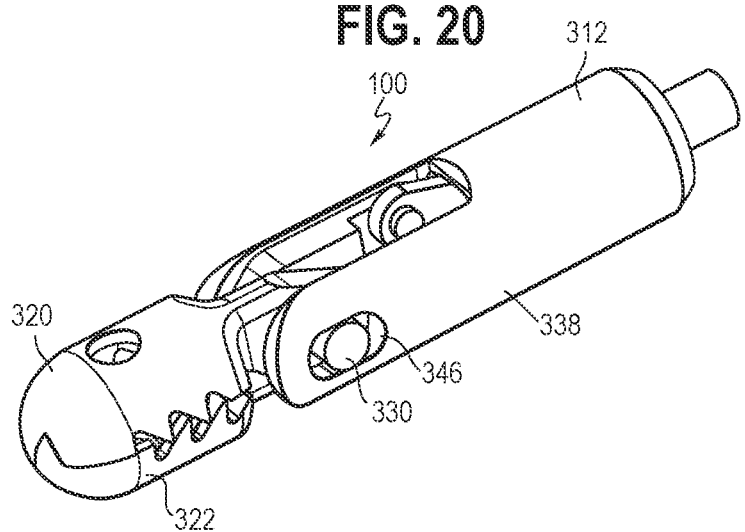
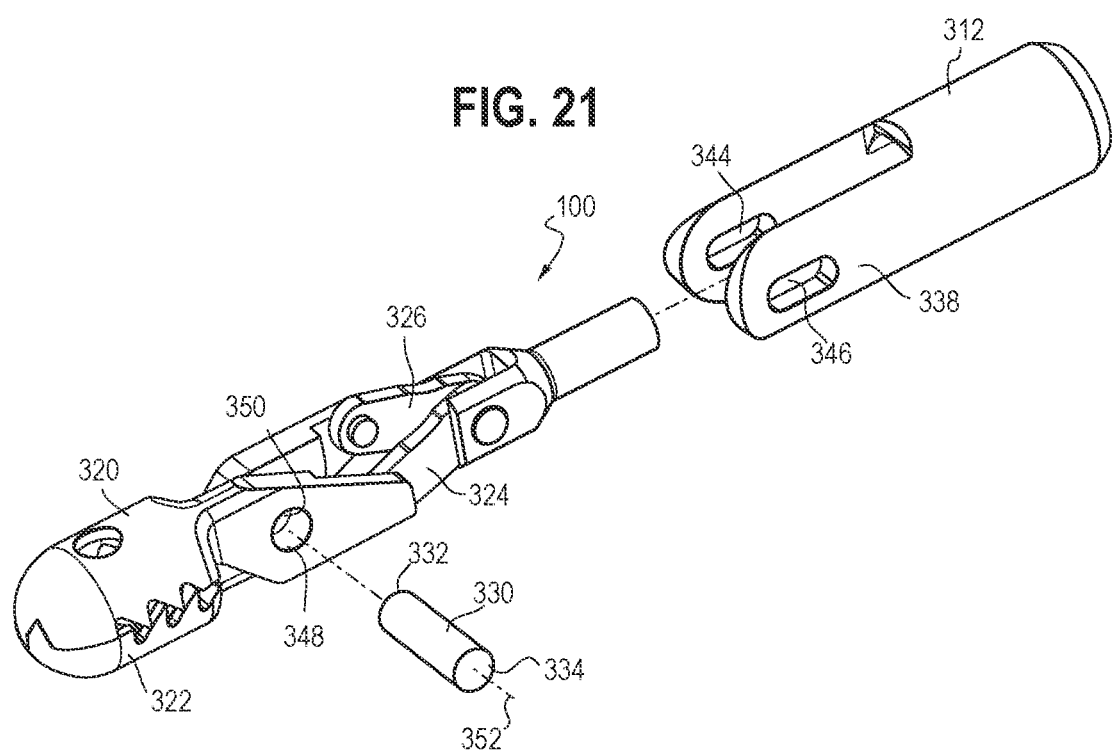

LOCKING FORCEPS

CROSS-REFERENCE TO RELATED APPLICATIONS

The present patent document is a continuation-in-part of U.S. patent application Ser. No. 16/900,037, which was filed on Jun. 12, 2020, and which claims the benefit of priority under 35 U.S.C. §§ 120-121 to U.S. patent application Ser. No. 15/260,676, which was filed on Sep. 9, 2016, now U.S. Pat. No. 10,716,546, and which claims the benefit of priority under 35 U.S.C. § 119(e) to U.S. Provisional Patent Application Ser. No. 62/218,782, which was filed on Sep. 15, 2015. All of the aforementioned patent applications are hereby incorporated by reference in their entirety.

TECHNICAL FIELD

Embodiments described herein relate to a medical device and, in particular to lockable forceps for use in various medical procedures.

BACKGROUND

Forceps are common medical devices used in a variety of procedures to grasp or engage bodily structures or other items. For example, forceps may be used to grasp tissue for hemostasis, marking, ligating, and sealing perforations. Forceps are also commonly used to obtain tissue samples during a biopsy procedure. In a biopsy, the forceps are closed around and excise a piece of tissue. The tissue and forceps are then removed from the patient for further testing.

Traditional forceps generally have two or more opposing jaws that can be opened and closed by an operator. The forceps are traditionally inserted into a patient's body lumen with the jaws in a closed position. Once the forceps are positioned near the tissue to be engaged, the jaws are opened. The jaws are then closed around the tissue, thus effectively grasping it. If a biopsy sample is desired, the forceps are then retracted and the tissue sample is torn from the surrounding tissue.

One of the problems associated with traditional forceps is the low grasping force of the jaws. While traditional forceps have a large initial closing force, the closing force continuously declines as the closure cycle progresses. Thus, once the jaws reach the closed position, the force required to reopen the closed jaws is relatively low. Therefore, while a large amount of tissue is initially grasped, the jaws have a difficult time maintaining their grip on the tissue, which may undesirably result in the tissue being released from the jaws. The low grasping force is especially concerning during a biopsy, as the forceps, in addition to grasping the tissue, must also remove the tissue, such as by tearing or cutting it. Thus, using traditional forceps includes a risk of obtaining an inadequate amount of tissue for a proper biopsy sample. Therefore, it is desirable to improve on traditional forceps by increasing the grasping force and maintaining that force throughout the closure cycle.

Additionally, forceps and similar devices are commonly used in a variety of applications outside of the medical field. In these various applications, there exists a similar desire for forceps that strongly and effectively grasp materials.

BRIEF SUMMARY

One general aspect of the present disclosure includes a forceps, including a housing defining an internal passageway and a longitudinal axis extending between proximal and distal ends of the housing; a first jaw slidably and pivotably connected to the housing; a second jaw slidably and pivotably connected to the housing, where the first and second jaws have an open configuration and a closed configuration; a first connection member having a first end pivotably connected to the first jaw; a second connection member having a first end pivotably connected to the second jaw; a connecting pin assembly that slidably and pivotably connects the first and second jaws to the housing; and a driver operably connected to a second end of the first connection member and a second end of the second connection member, where longitudinal movement of the driver in a proximal direction relative to the housing moves the first and second jaws, along with the connecting pin assembly, relative to the housing from the open configuration to the closed configuration, and where longitudinal movement of the driver in a distal direction relative to the housing moves the first and second jaws, along with the connecting pin assembly, relative to the housing from the closed configuration to the open configuration.

Another general aspect of the present disclosure includes a forceps, including a housing defining an internal passageway and a longitudinal axis extending between proximal and distal ends of the housing; a first jaw slidably and pivotably connected to the housing; a second jaw slidably and pivotably connected to the housing, where the first and second jaws have an open configuration and a closed configuration; a first connection member having a first end pivotably connected to the first jaw; a second connection member having a first end pivotably connected to the second jaw; a connecting pin assembly that slidably and pivotably connects the first and second jaws to the housing; and a driver operably connected to a second end of the first connection member and a second end of the second connection member, where longitudinal movement of the driver in a proximal direction relative to the housing moves the first and second jaws, along with the connecting pin assembly, relative to the housing from the open configuration to the closed configuration, and where translation of the first and second jaws and the connecting pin assembly relative to the housing is not constrained by the connection between the connecting pin assembly and the first and second jaws.

Another general aspect of the present disclosure includes a forceps, including: a housing defining an internal passageway and a longitudinal axis extending between proximal and distal ends of the housing; a first jaw slidably and pivotably connected to the housing; a second jaw slidably and pivotably connected to the housing, where the first and second jaws have an open configuration and a closed configuration; a first connection member having a first end pivotably connected to the first jaw; a second connection member having a first end pivotably connected to the second jaw; and a connecting pin assembly that slidably engages the housing, where the first and second jaws are pivotable about a longitudinal axis of the connecting pin assembly, a driver operably connected to a second end of the first connection member and a second end of the second connection member, and where longitudinal movement of the driver in a proximal direction relative to the housing moves the first and second jaws, along with the connecting pin assembly and the first and second connection members, relative to the housing from the open configuration to the closed configuration.

The foregoing paragraphs have been provided by way of general introduction, and are not intended to limit the scope of the following claims. The various preferred embodiments, together with further advantages, will be best understood by reference to the following detailed description taken in conjunction with the accompanying drawings.

BRIEF DESCRIPTION OF THE DRAWINGS

The present disclosure can be better understood with reference to the following drawings and description. The components in the figures are not necessarily to scale, emphasis instead being placed upon illustrating the principles of the present disclosure, although certain figures may be illustrated to scale and relied upon as such. Moreover, in the figures, like-referenced numerals designate corresponding parts throughout the different views.

FIG. 20 is a perspective view of a third embodiment of another forceps design in a closed configuration.

FIG. 21 is an exploded view of the forceps design of FIG. 20.

DETAILED DESCRIPTION

Figure 1:
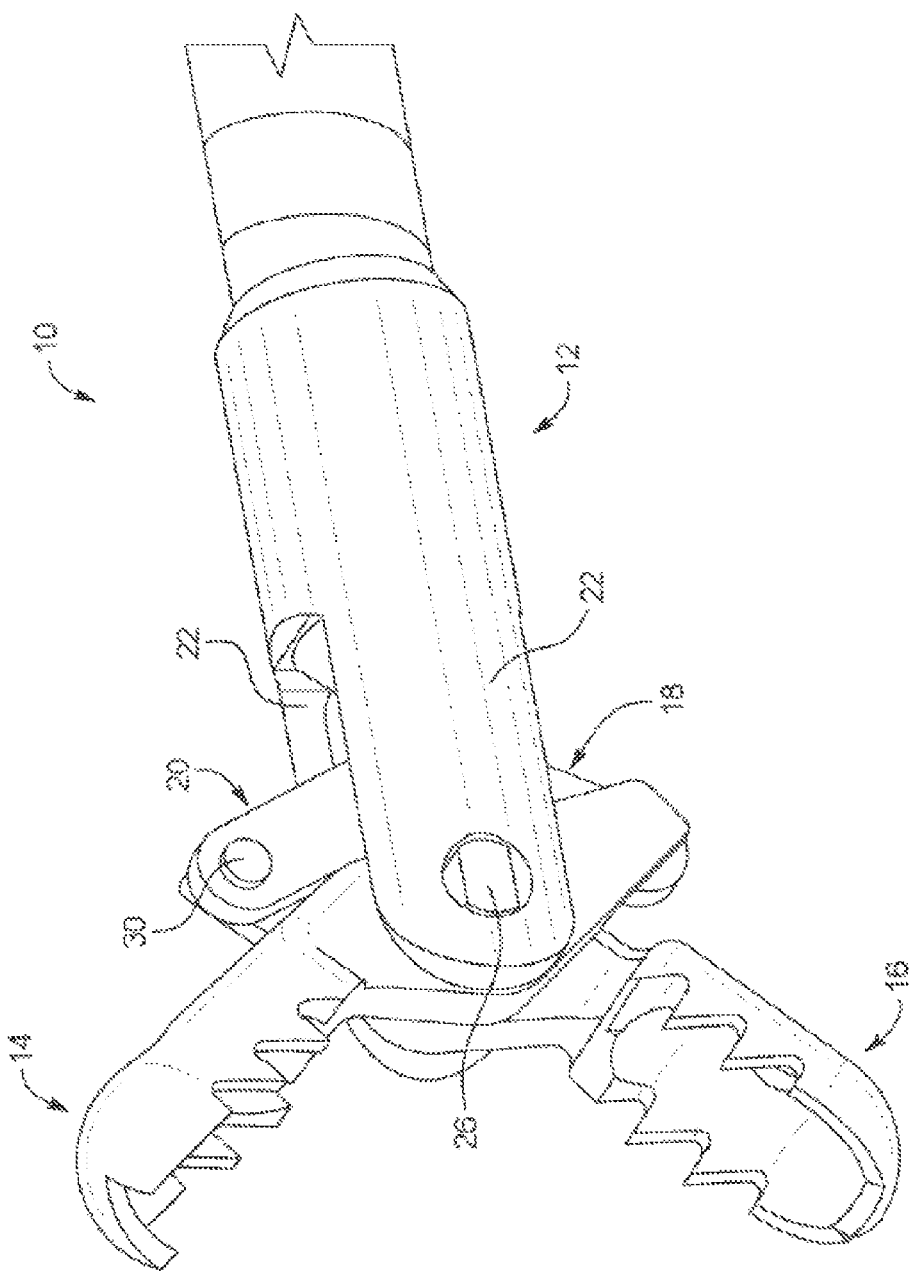
FIG. 1 is an orthographic view of a forceps design in an open configuration.

Various aspects are described below with reference to the drawings in which like elements generally are identified by like numerals. The relationship and functioning of the various elements of the aspects may better be understood by reference to the following detailed description. However, aspects are not limited to those illustrated in the drawings or explicitly described below. It also should be understood that the drawings are not necessarily to scale (although certain drawings may be drawn to scale and relied upon as such), and in certain instances details may have been omitted that are not necessary for an understanding of aspects disclosed herein, such as conventional material, construction, and assembly.

For purposes of promoting an understanding of the presently disclosed embodiments, reference will now be made to the embodiments illustrated in the drawings, and specific language will be used to describe the same. It should nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

In the present application, the terms "proximal" and "distal" should be understood as being in the terms of a physician delivering the forceps to a patient. Thus, the term "proximal" refers to a direction that is generally towards a physician during a medical procedure (e.g., meaning the portion of the forceps that is nearest to the physician), while the term "distal" refers to a direction that is generally towards a target site within a patient's anatomy during a medical procedure (e.g., meaning the portion of the forceps that is farthest from the physician). The term "configured to" is used to describe structural limitations in a particular manner that requires specific construction to accomplish a stated function and/or to interface or interact with another component(s), and is not used to describe mere intended or theoretical uses. Relative terminology and broader terms such as "generally," "about," "substantially," and the like will be understood by those of skill in the art as providing clear and definite scope of disclosure and/or claiming. For example, the term "about 90 degrees" will be understood as not requiring exactly 90.00 degrees, but rather including that and functional equivalents.

Figure 2:
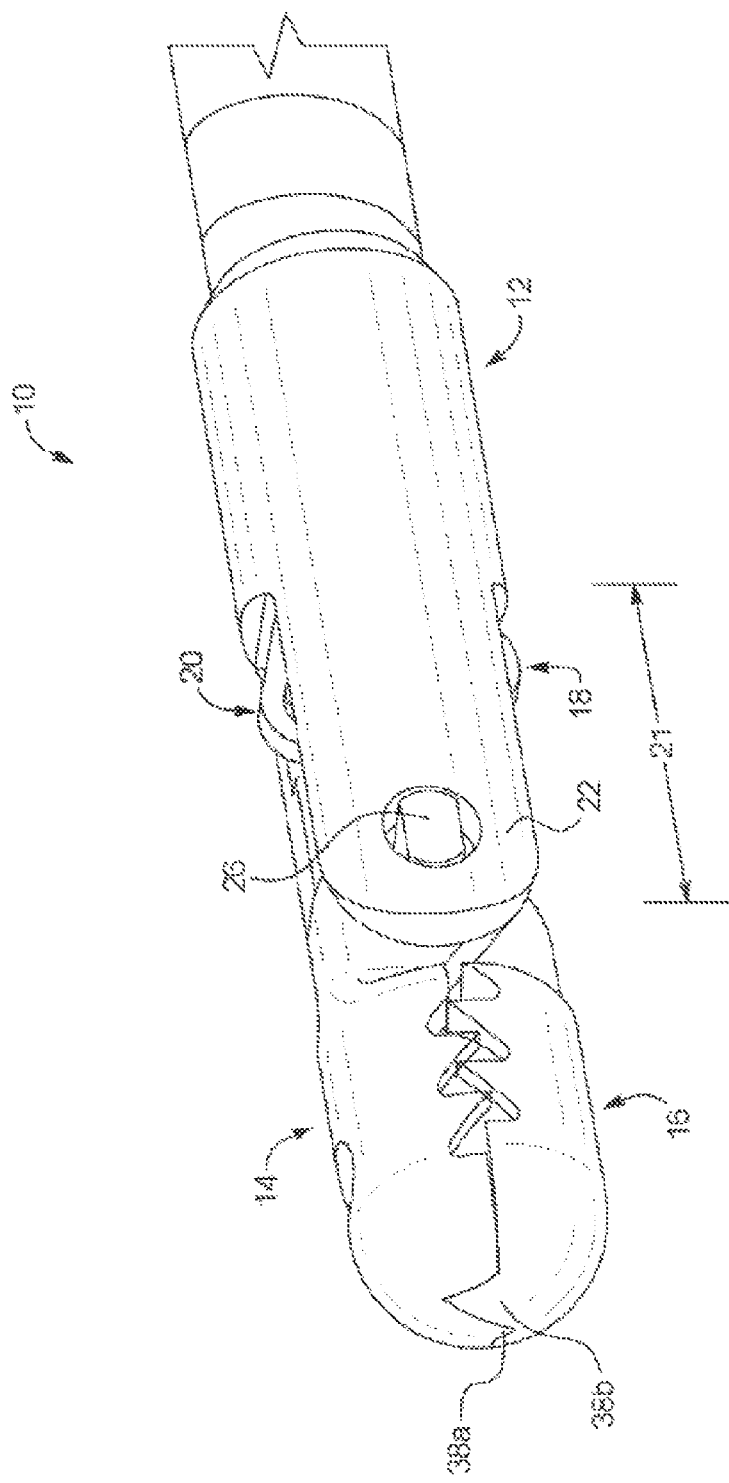
FIG. 2 is an orthographic view of a forceps design in a closed configuration.

FIGS. 1 and 2 show a forceps 10. FIG. 1 shows the forceps 10 in an open configuration and FIG. 2 shows the forceps 10 in a closed, or locked, configuration. The forceps 10 may include a housing 12, a first jaw 14, and a second jaw 16. The forceps 10 may further include a first connection member 18 and a second connection member 20. In this embodiment the first and second connection members 18, 20 are links; however, the first and second connection members 18, 20 may include other designs, including using several links placed in series to create linkages with various kinematic advantages. Each link 18, 20 may have cutout portions 17, 19, or scallops, along the sides of the links 18, 20. A distal portion 21 of the housing 12 may include a forked portion 22. A connecting pin 26 may be fixedly secured to the forked portion 22. The first jaw 14 may include a first opening 24 and the second jaw 16 may include a second opening 25 (concentric with the first opening 24 when viewed from the side angle in FIG. 3) for insertion of the connecting pin 26, thus allowing the first and second jaws 14, 16 to be slidably and pivotably connected to the forked portion 22 of the housing 12. Alternatively, two separate connecting pins may be used, one for each jaw 14, 16. The first jaw 14 may be pivotably connected to one end of the first link 18 with a first pin 28 (not shown). The other end of the first link 18 may be pivotably connected to a driver 40 (shown in FIG. 3). The second jaw 16 may be pivotably connected to one end of the second link 20 with a second pin 30 similar to the connection described above for the first pin 28. The other end of the second link 20 may be pivotably connected to the driver 40.

Figure 3:
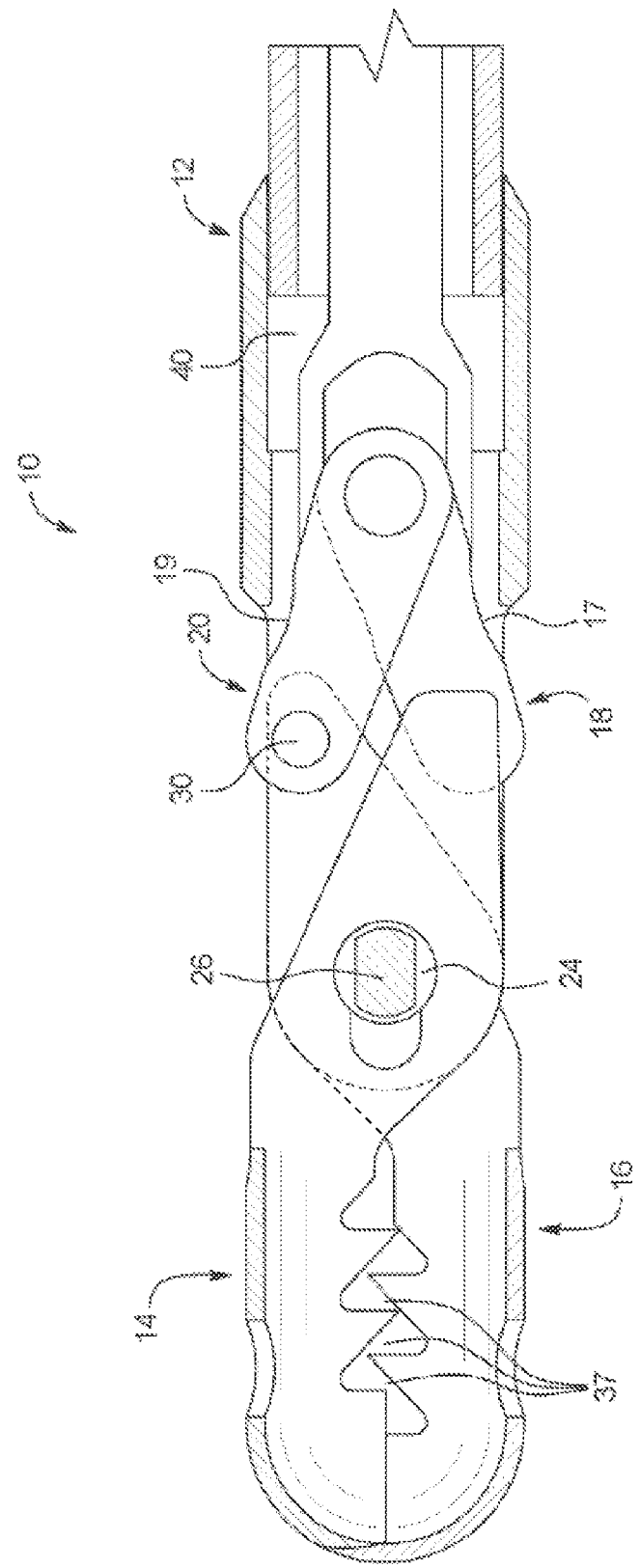
FIG. 3 is a sectional side view of a forceps design.

FIG. 3 shows the structure of the forceps 10 within the housing 12. As can be seen, one of the ends of each the first and second links 18, 20 are pivotably connected to the driver 40. The driver 40 may be a stiff elongated wire or shaft that ideally extends to a point external the patient during the procedure. In some embodiments, the housing 12 may include an elongated shaft with a hollow portion through which the driver 40 is movably disposed. A portion of the housing 12, or another shaft operably connected to the housing 12, ideally extends to a point external the patient during operation. The connecting pin 26 and openings 24, 25 may be designed to allow two degrees of freedom of each of the jaws 14, 16: longitudinal movement along a longitudinal axis of the housing 12 and rotational movement about the connecting pin 26. In this example, the connecting pin 26 has a cross-section that is elongated in shape with two flattened edges and two curved edges. The openings 24, 25 may each include two portions that control the operation of the forceps as described in more detail below. The first opening 24 may include a first cylindrical portion 32 and a first elongated portion 34 (shown in FIGS. 4 and 5). The second opening 25 includes similar portions, a second cylindrical portion 33 and a second elongated portion 35 (not shown). Other shapes for the two portions may also be used. When the connecting pin 26 is partially or fully disposed within the cylindrical portions 32, 33 of the openings 24, 25, the jaws 14, 16 may rotate open and closed. Relatedly, when the jaws 14, 16 are partially or fully closed, the connecting pin 26 may partially or fully mate with the elongated portion 34, 35 of the openings 24, 25 and the jaws 14, 16 may slide longitudinally along the connecting pin 26 via the openings 24, 25 between the positions shown in FIGS. 3 and 8. As shown, once the connecting pin 26 is at least partially disposed within the elongated portions 34, 35 of the openings 24, 25, the presence of at least one flat edge on elongated shape of the connecting pin 26 may limit full rotational movement of the jaws 14, 16.

Figure 4:
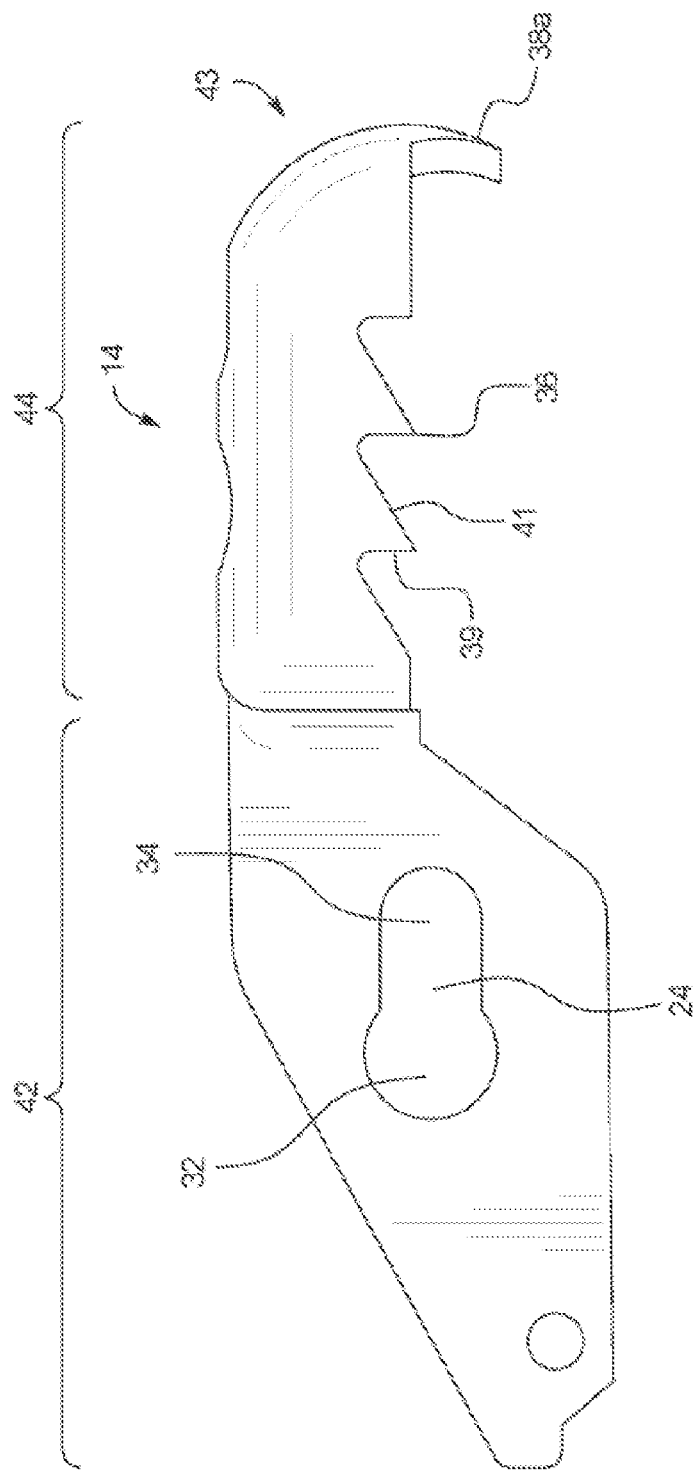
FIG. 4 is a detailed side view of a jaw used in a forceps design.
Figure 5:
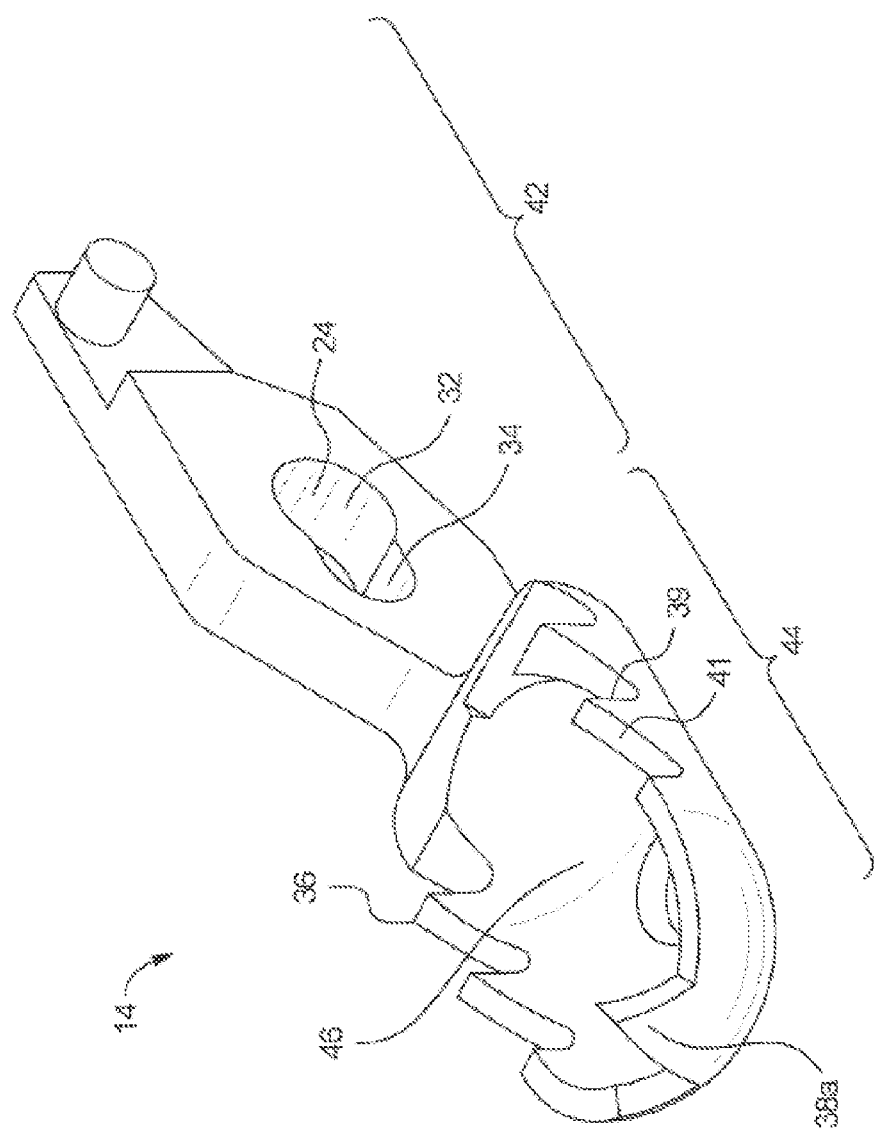
FIG. 5 is a detailed orthographic view of a jaw used in a forceps design.

FIGS. 4 and 5 show detailed views of the first jaw 14, which in some embodiments is identical in design to the second jaw 16. FIG. 5 shows the embodiment of the first jaw 14 that is shown in FIGS. 1-3, while FIG. 4 is an alternate design that may be used in the forceps embodiment discussed in FIGS. 12 and 13 below. The first jaw 14 may include a connection portion 42 and a clamping portion 44. The connection portion 42 interacts with the rest of the forceps 10 as previously described, while the clamping portion 44 is used to interact with tissue or other materials. The clamping portion 44 may be optimized for tissue biopsy collection by having a cup shape design with a hollow portion 46 in the middle of the clamping portion 44. Thus, when the first and second jaws 14, 16 close, the hollow portions 46 provide an open space for tissue to be collected and stored for retrieval. The clamping portion 44 may further include rows of teeth 36. In some embodiments, the teeth 36 may be located on either side of the hollow portion 46. During a biopsy, the tissue sample is most commonly excised from the surrounding tissue by proximally retracting the forceps 10 in the closed configuration while the teeth 36 tear the tissue. To increase the effectiveness of the tissue tearing, teeth 36 may each have a proximal face 39 that extends vertically from the clamping portion 44 and a distal face 41 that extends at a proximal angle from the clamping portion 44. The vertical proximal face 39 may maintain a grip on the tissue more effectively when retracting the forceps 10 and tearing the tissue when compared to an angled face. In other embodiments, the teeth and faces may be arranged differently to achieve various advantages. For example, the proximal face 39 may also extend at a proximal angle from the clamping portion 44 to more effectively grasp the tissue. Both proximal and distal faces 39, 41 may also extend at a distal angle or at other various angles from the clamping portion 44 as desired. Additionally, the jaws 14, 16 may be designed to mate such that the teeth 36 are staggered and gaps 37 exist between the teeth 36 of the two jaws when the jaws 14, 16 mate in the closed configuration (shown in FIG. 3). In one example, the point of a tooth 36 on one of the jaws 14, 16 may mate at the midpoint of the distal face 41 of a tooth 36 on the other jaw 14, 16. This pattern may be repeated for the rest of the teeth 36, thereby forming the aforementioned gaps 37. These gaps 37 provide additional space for the tissue sample to be stored so a sufficient sample size is obtained during the biopsy. The clamping portion 44 may also include a sharptooth, or "rat's tooth" 38a at a distal end 43 of the first jaw 14 with a mating tooth 38b on the second jaw 16 (shown in FIG. 2). The rat's tooth 38a, 38b is effective in providing the initial tearing of the tissue sample. The clamping portion 44 may optionally include a spike 76 disposed within the center of the hollow portion 44 to help secure the tissue within the forceps 10 for removal of the tissue biopsy from the patient (shown as exemplary in FIG. 12). The spike 76 may be formed with the tip pointed distally, which may help anchor the forceps 10 into the tissue and increase the amount of tissue initially grabbed by the forceps 10. The spike 76 may alternatively be formed with the tip pointed vertically or even proximally, which may assist the forceps 10 in maintaining the grip on the tissue during the excising and removal of the sample. While this example describes the design of the clamping portion 44 as optimized for a tissue biopsy, the clamping portion 44 may be altered for various other uses.

Figure 6:
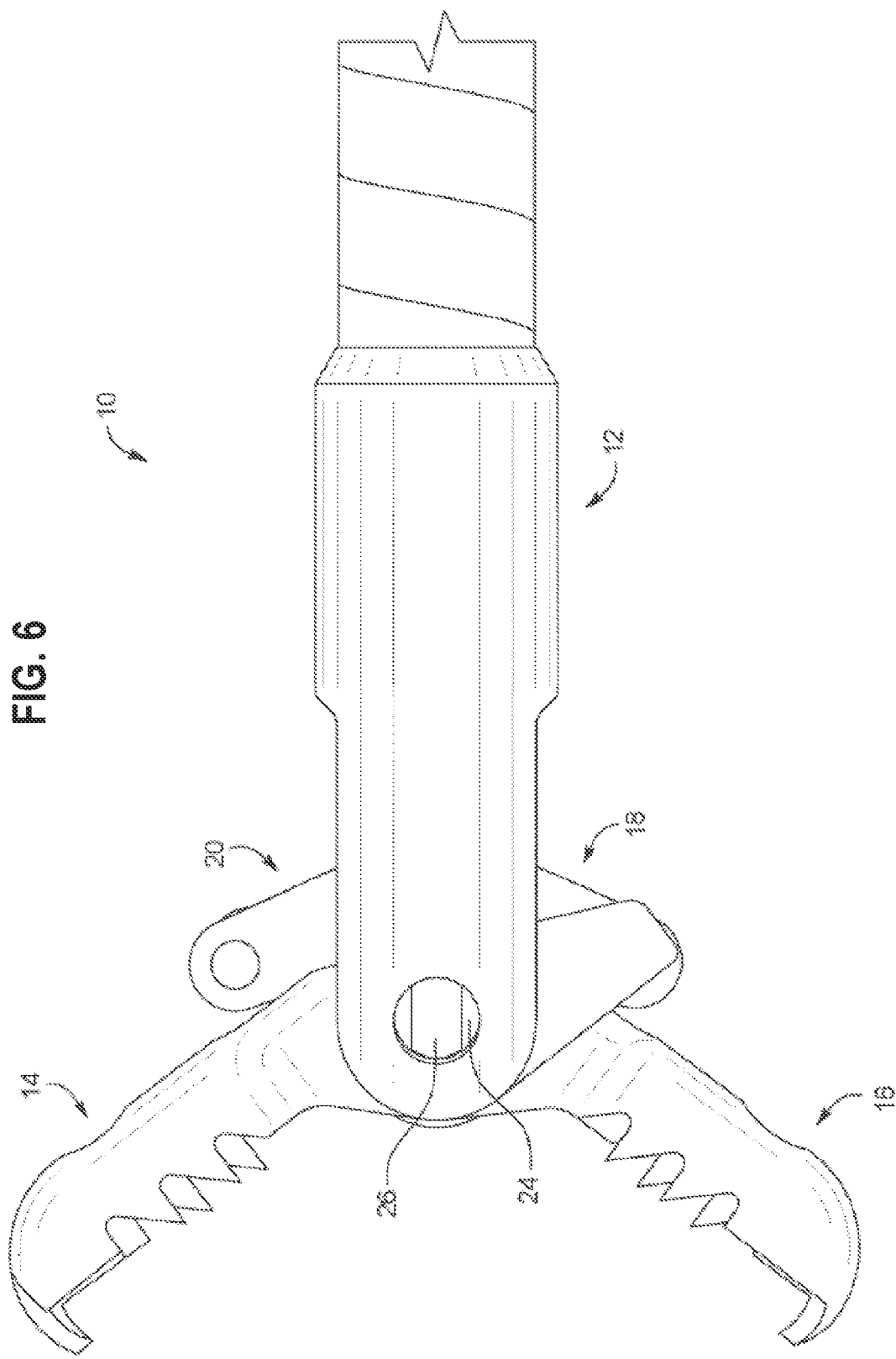
FIG. 6 is a side view of a forceps design in an open configuration.
Figure 7:
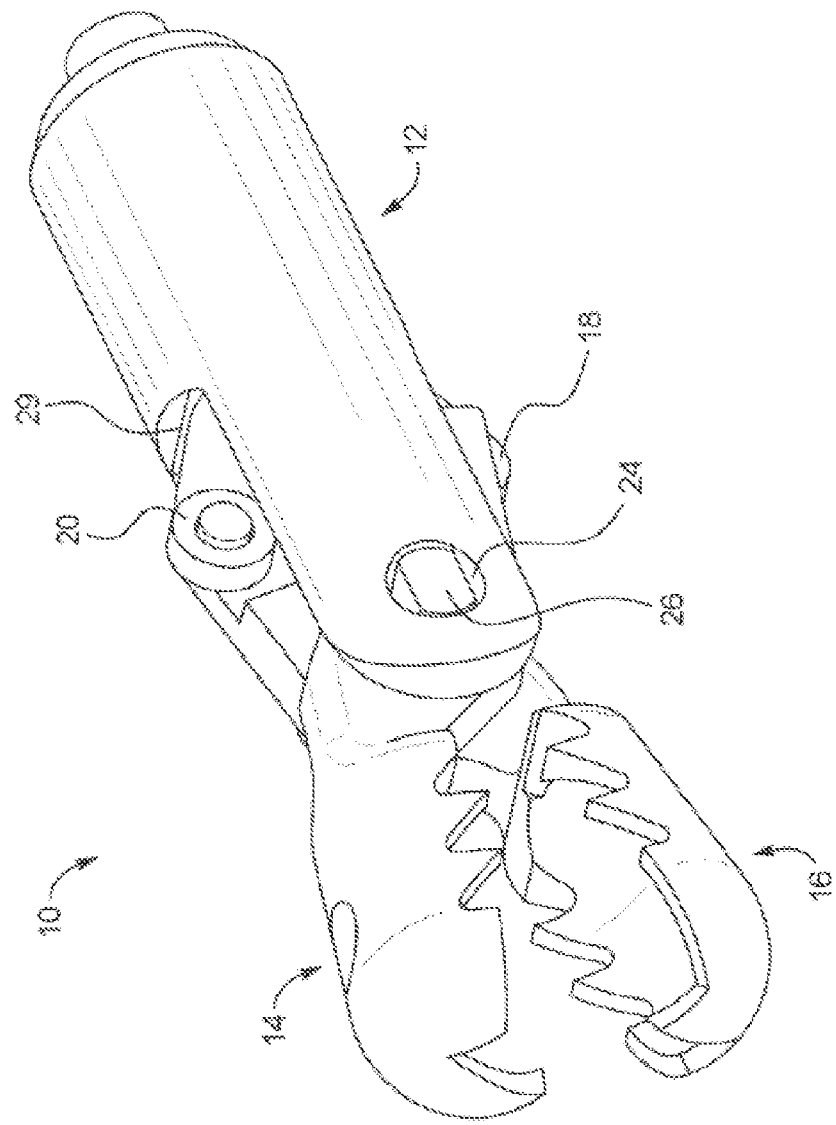
FIG. 7 is a side view of a forceps design during the camming action of the closure cycle.
Figure 8:
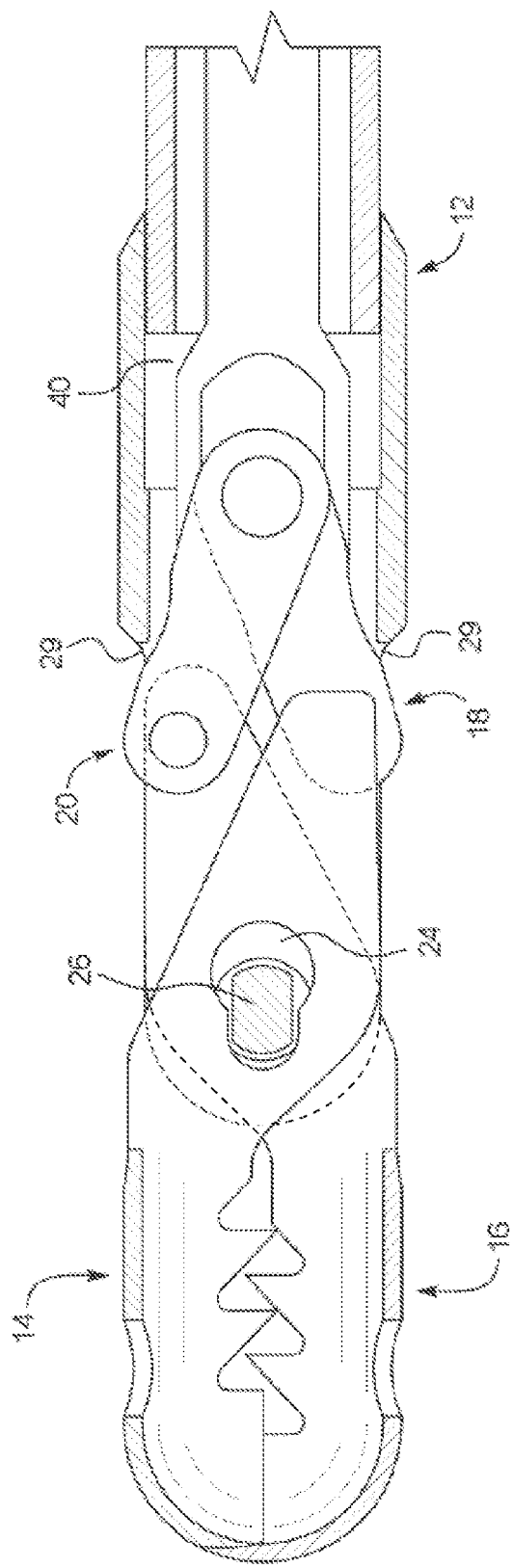
FIG. 8 is a side view of a forceps design in a closed configuration.

FIGS. 6-8 show the forceps 10 in various stages of operation. As described above, the jaws 14, 16 of the forceps 10 may be moved in two separate degrees of freedom: rotationally and longitudinally. Specifically, the jaws 14, 16 may rotate open and closed and also slide longitudinally along a longitudinal axis of the forceps 10. However, in this embodiment, the rotational and longitudinal movement of the jaws 14, 16 does not always occur in discrete and separate stages of operation. Instead, due to the shape of the connecting pin 26 and openings 24, 25 along with the actuating force of the driver 40 and the design of the links 18, 20 and the housing 12, the jaws 14, 16 open and close via a blended motion where the rotational and longitudinal movements of the jaws 14, 16 occur simultaneously during certain stages of the closure cycle. FIG. 6 shows the forceps 10 in an open configuration where the jaws 14, 16 are fully open. In the open configuration, the connecting pin 26 may be fully disposed within the cylindrical portions 32, 33 of the openings 24, 25. To move the jaws 14, 16 to the closed configuration, the driver 40 is moved proximally with respect to the housing 12. As the driver 40 is moved proximally, the ends of the links 18, 20 connected to the driver 40 are correspondingly pulled in a proximal direction, while the ends of the links 18, 20 connected to the jaws 14, 16 are pulled in a proximal direction while also being rotated towards each other. As the links 18, 20 move proximally while also partly rotating towards each other, the jaws 14, 16 each pivot about the connecting pin 26, which causes the jaws 14, 16 to begin to close. Once the jaws 14, 16 pivot about the connecting pin 26 a sufficient amount, the connecting pin 26 may begin to mate with the elongated portions 34, 35 of the openings 24, 25. Thus, the jaws 14, 16 may begin to slide proximally via the connecting pin 26 along the elongated portions 34, 35 of the openings 24, 25 as the jaws 14, 16 continue to rotate closed. As the driver 40 continues to move in a proximal direction, the links 18 and 20 eventually contact the housing 12 at contact points 29 as shown in FIGS. 7 and 8. Once the links 18, 20 contact the housing 12, they may remain in contact as the forceps 10 continue to be moved to the closed configuration. The connecting pin 26 and openings 24, 25 may be designed such that a small amount of clearance exists between the connecting pin 26 and openings 24, 25. While a tight tolerance may be desirable to ensure smooth operation of the forceps 10, providing clearance between the connecting pin 26 and openings 24, 25 may also be advantageous and helps enable blended motion. As the links 18, 20 first contact the housing 12, the initial force provided by the housing 12 against the links 18, 20 causes the links 18, 20 to push back against the jaws 14, 16. The initial force from the housing 12 against the links 18, 20 causes the jaws 14, 16 to slide slightly distally back towards the cylindrical portions 32, 33 of the openings 24, 25. Providing this clearance prevents the connecting pin 26 from binding or catching on the openings 24, 25—thereby ensuring smooth operation of the forceps 10 throughout the closure cycle. Further, the cutout portions 17, 19 in the links 18, 20 provide additional clearance between the links 18, 20 and the housing 12 to limit the likelihood of the forceps 10 binding or catching.

Figure 9:
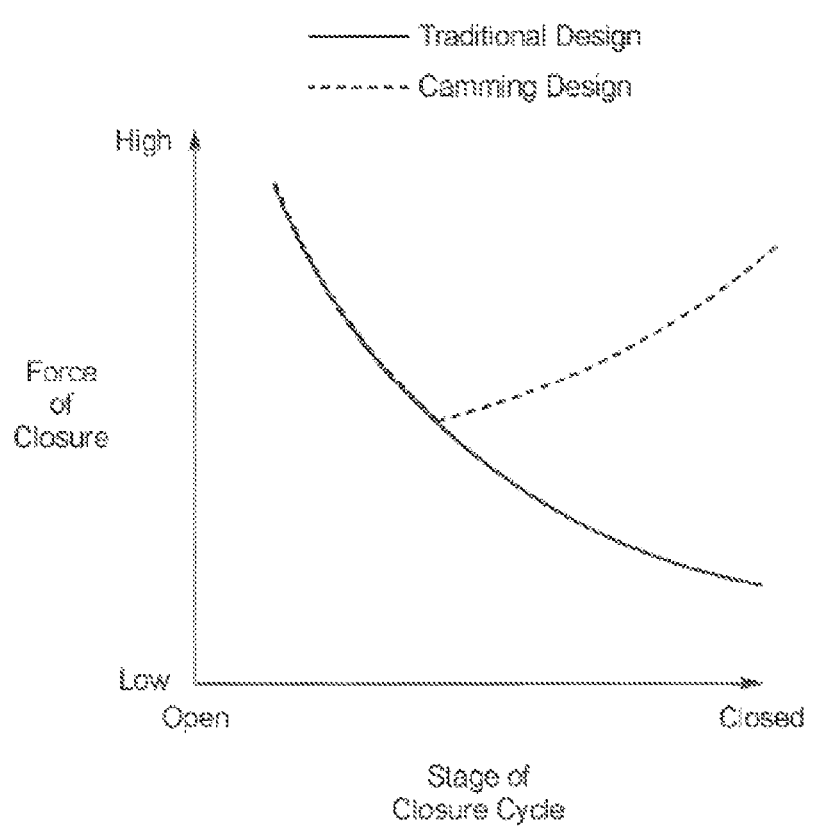
FIG. 9 is a schematic force/closure cycle graph comparing a traditional forceps design and the improved design contemplated herein.

Additionally, a camming action occurs when contact is made between the housing 12 and the links 18, 20. This camming action gives the present design a mechanical advantage over traditional forceps. As discussed previously, traditional linked forceps that utilize a simple scissor-like closing motion do not have a high closing force near the end of the closing motion. FIG. 9 shows a schematic force/closure graph comparing a traditional forceps design (solid line) with the present invention (dotted line). As can be seen for traditional forceps, the closing force is high near the beginning of the closure cycle; however, the closing force continuously decreases as the jaws close. The closing force is at its lowest when the forceps are in the closed configuration. In comparison, while the first portion of the force/closure graph is similar for the present invention, the closure force begins to increase rather than decrease near the latter stages of the closure cycle. This difference in closure force is due, in part, to the aforementioned camming action. The camming action creates a force by the housing 12 against the links 18, 20 which provides a corresponding increasing force against the jaws 14, 16 that urges the jaws 14, 16 towards the closed configuration. Additionally, the aforementioned clearance between the connecting pin 26 and the openings 24, 25 along with the cutout portions 17, 19 of the links 18, 20 may help the camming action occur more smoothly. Without these clearances, the forceps 10 may bind and be inoperable. It is important to note that FIG. 9 is exemplary, and the present embodiment may not necessarily cause the closing force to increase during the latter portion of the closure cycle. Rather, the camming action may instead cause a slight departure from the traditional forceps design's force/closure graph. For example, the closing force may still continue to decrease during the latter stages of the present embodiment's closure cycle, but may decrease less significantly when compared to the traditional forceps closing force. Overall, the present embodiment provides a greater closing force near the latter stages of the closure cycle when compared to a traditional forceps design, and the significance of the departure from the traditional forceps design may vary based on various design characteristics of the present embodiment.

After contact is made between the links 18, 20 and the housing 12, further proximal movement of the driver causes the jaws 14, 16 to continue to close as the aforementioned camming action is maintained. Due to the designed clearance between the openings 24, 25 and the connecting pin 26, the jaws 14, 16, which had previously slid distally due to the initial contact between the housing 12 and the links 18, 20, will once again begin to slide proximally along the longitudinal axis as the connecting pin 26 slides further within the elongated portions 34, 35 of the openings 24, 25. The jaws 14, 16 will continue to rotate together and slide proximally as the driver 40 is further moved in a proximal direction. Eventually, but not necessarily, the jaws 14, 16 are rotated together such that the clamping portions 44 are in contact with one another just prior to the point when the connecting pin 26 contacts the proximal end of the elongated portions 34, 35 of the openings 24, 25. Then, the driver 40 is pulled slightly further proximally until the connecting pin 26 contacts the proximal end of the elongated portions 34, 35 of the openings 24, 25. At this point the forceps 10 are in the closed configuration and the driver 40 may not be moved any further in the proximal direction (FIG. 8). Additionally, as the jaws 14, 16 slide proximally along the elongated portions 34, 35 of the openings 24, 25, the links 18, 20 continue to contact the housing 12, with an increasing force being provided by the housing 12 against the links 18, 20. Once the forceps 10 are in the closed configuration, the links 18, 20 are at least partially wedged within the housing 12. The wedging of the links 18, 20 and the aforementioned camming action locks the jaws 14, 16 closed and prevents the jaws 14, 16 from being easily or accidentally reopened and thus potentially losing their grip on the object being grabbed. The jaws 14, 16 may also be further prevented from being accidentally reopened by the shape of the connecting pin 26 with respect to the elongated portions 34, 35 of the openings 24, 25, which limits rotational motion of the jaws 14, 16. To move the forceps 10 back to the open configuration, the driver 40 is moved distally relative to the housing 12, thus reversing the closure cycle previously described. The forceps 10 may be moved repeatedly between the open and closed configurations.

Figure 10:
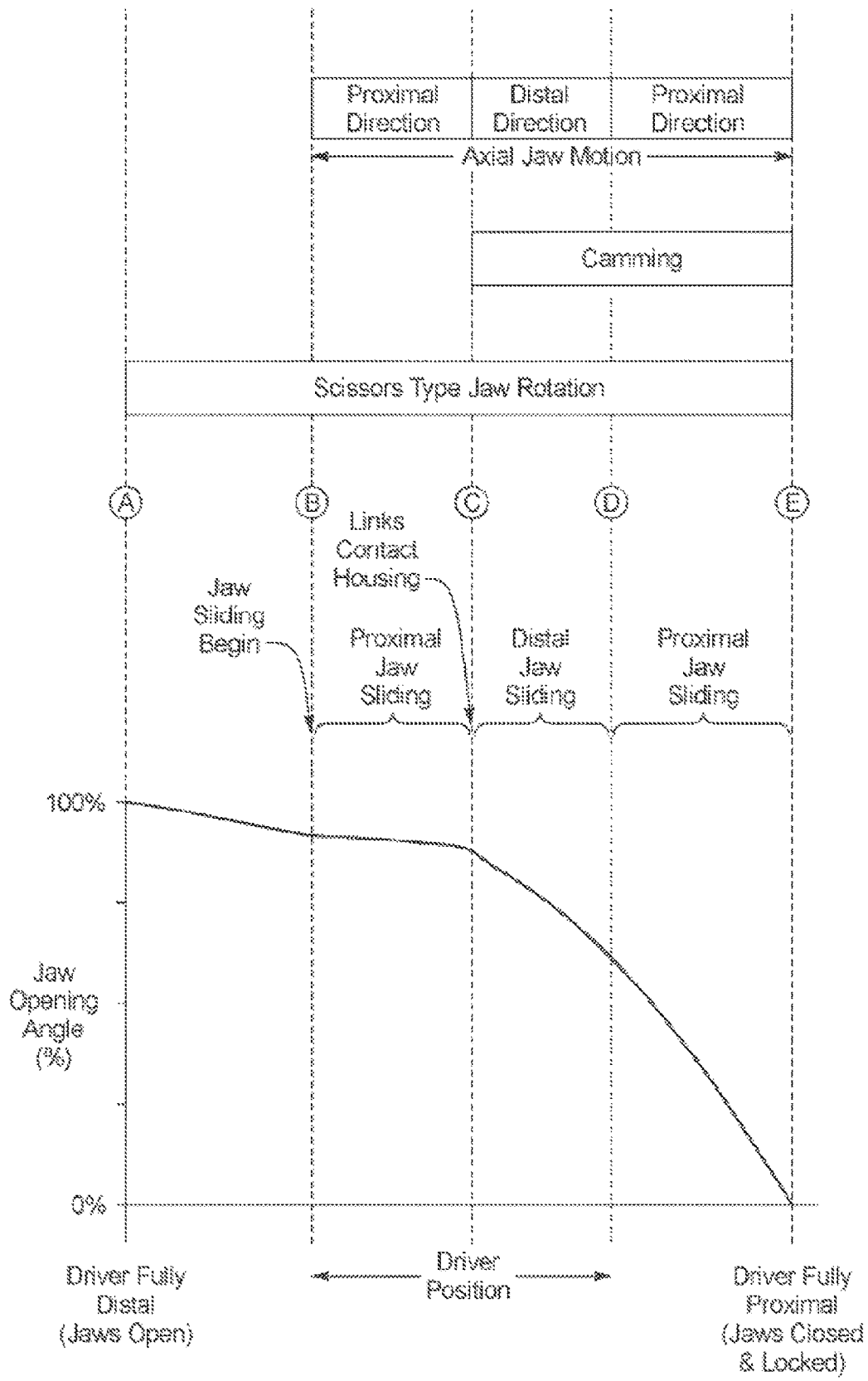
FIG. 10 is a graphical representation of the stages in the closure cycle of a forceps design.

FIG. 10 shows a graphical representation of one embodiment of the closure cycle. As the forceps 10 move from the open configuration to the closed configuration, several changes in the mechanics of the forceps 10 occur. In FIG. 10, the forceps 10 start in the open configuration (A) on the left-hand side of the graph and end in the closed, or locked, configuration (E) on the right-hand side of the graph. First, as the forceps begin to move from the open configuration to the closed configuration, scissors-type rotation of the jaws 14, 16 occur as the jaws 14, 16 rotate about the connecting pin 26 (between A and E). Due to the clearance between the connecting pin 26 and the openings 24, 25, proximal sliding of the jaws 14, 16 will eventually occur while the jaws 14, 16 continue to rotate closed (between B and C). As the jaws 14, 16 are further rotated closed, the links 18, 20 eventually contact the housing 12 (C). At this point the camming action begins (between C and E) and the jaws 14, 16 slide slightly distally due to kinematics and the camming action along with the initial force provided by the housing 12 against the links 18, 20 (between C and D). Eventually, the jaws 14, 16 begin to slide proximally again as the camming action continues and the jaws 14, 16 continue to rotate to a closed configuration (between D and E). Ideally, but not necessarily, the jaws 14, 16 close completely and the scissors-type rotation will cease just prior to the openings 24, 25 limiting proximal motion of the jaws 14, 16. At this point, the forceps 10 are in the closed, and fully locked, configuration (E). This is merely one potential embodiment of a closure cycle. The forceps 10 may be altered such that the rotation, sliding, and contact with the housing may occur at various points during the closure cycle as desired.

In the present embodiment, the links 18, 20 are designed to initially contact the housing 12 near the midpoint of the closure cycle. Beginning the camming action mid-stroke is advantageous as additional closure force is needed near that point in the closure cycle. Starting the camming action too early in the closure cycle puts unnecessary stress on the links 18, 20 and the housing 12, while starting the camming action too late eliminates the advantages provided by the camming action. However, the forceps 10 can be designed to start the camming action earlier or later as desired. For example, the links 18, 20 can be redesigned or the forked portion 22 in the housing 12 can be made shorter, longer, or otherwise shaped differently. Further, the shape of the links 18, 20 may be altered, such as the depth or position of the cutout portions 17, 19.

In the present embodiment, the openings 24, 25 are formed within the jaws 14, 16 and the connecting pin 26 is fixedly attached to the housing 12. In an alternative embodiment, one opening 24 may be formed on one fork of the forked portion 22 of the housing 12 while the other opening 25 is formed on the other fork of the forked portion 22. The forceps may then also include a first connecting pin fixedly attached to the first jaw 14 and pivotably and slidably received within the first opening 24 and a second connecting pin fixedly attached to the second jaw 16 and pivotably and slidably received within the second opening 25.

The connecting pin 26 may have various shapes while the openings 24, 25 may be altered to provide various kinematic advantages. For example, the connecting pin 26 may be ovular in shape, which may allow the forceps 10 and jaws 14, 16 to smoothly transition from rotating about the connecting pin 26 within the cylindrical portions 32, 33 of the openings 24, 25 to sliding longitudinally along the elongated portions 34, 35 of the openings 24, 25. Alternatively or additionally, the openings 24, 25 may be curved or have a teardrop shape. The clearance between the connecting pin 26 and openings 24, 25 may allow the jaws 14, 16, by way of the openings 24, 25, to slide smoothly along the connecting pin 26 as the forceps 10 are moved from the open configuration to the closed configuration.

Figure 11:
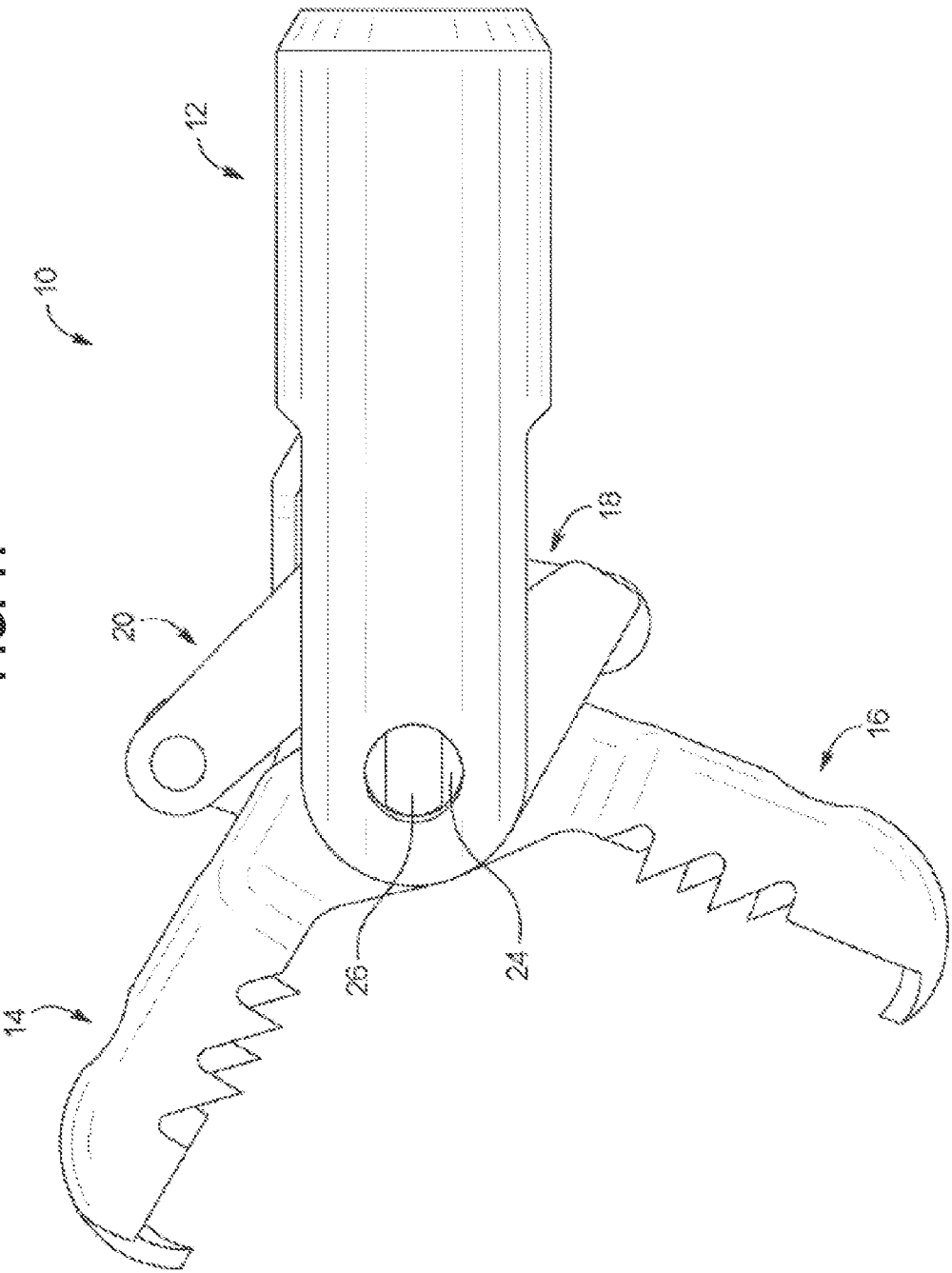
FIG. 11 is a side view of a forceps design with an additional degree of freedom.

The forceps 10 may also be designed with an additional degree of freedom when in the open configuration. In FIG. 11, the forceps 10 are shown with the jaws 14, 16 rotated in the same direction around the connecting pin 26 such that the jaws remain in the open configuration during this rotation. The jaws 14, 16 can be rotated together side to side while the jaws 14, 16 are maintained in the open configuration. This freedom of movement is achieved by maintaining a clearance between the internal passageway of the housing 12 and the driver 40. Thus, when the jaws 14, 16 come into contact with a body structure, the force between the body structure and the jaws 14, 16 may cause the jaws 14, 16 to rotate around the connecting pin 26 such that the clamping portions 44 of the jaws 14, 16 align with the target tissue. This freedom of movement may be advantageous to allow the forceps 10 to navigate to difficult areas of tissue in tight body lumens or through the passageways of an introducer device.

The forceps 10 may optionally include the ability to electrify the jaws 14, 16. When the jaws 14, 16 are grasping the tissue, an electric current may be run through the jaws 14, 16 to cauterize the tissue, which may help in separating a tissue sample from the surrounding tissue and to prevent bleeding.

The forceps 10 may be made with any metal that can be machined or formed into the components required to make the forceps assembly including, but not limited to: stainless steel, titanium, cobalt chromium, and nickel cobalt. Additive manufacturing may also be used to manufacture the forceps. Additionally, the forceps 10 may be made with any polymer, ideally a biocompatible one including, but not limited to: injection molded plastic or a reinforced polymer composite. Additionally, any combination of metal and plastic may be used to make the forceps such as a metal with an overmolded plastic.

While this embodiment is described in terms of open and closed configurations, the forceps 10 may have additional distinct stages or configurations throughout the closure cycle. For example, rather than the smooth and continuous, or blended, motion described above that includes rotational and longitudinal movement of the jaws 14, 16 along with a camming action, there may be distinct stages of the closure cycle where only rotational motion of the jaws 14,16 occurs, followed by a second distinct stage where only longitudinal motion of the jaws 14, 16 occurs. Alternatively, additional configurations may be contemplated, such as providing a fourth configuration that may allow various kinematic advantages or an increased closing force.

The forceps 10 previously described may be used in a tissue biopsy procedure. A scope, often an endoscope, may be advanced into a patient's body lumen, with the camera used to locate the target site. The forceps 10 may then be advanced to the target site through a lumen of the scope or along the external surface of the scope. The forceps 10 are ideally advanced in the closed configuration due to the smaller profile of the forceps 10 when compared to the open configuration. Once the jaws 14, 16 are positioned near the tissue to be biopsied, the forceps 10 are moved to the open configuration by moving the driver 40 distally with respect to the housing 12. Once the forceps 10 are in the open configuration, the jaws 14, 16 are positioned adjacent to the tissue and then moved to the closed configuration such that the jaws 14, 16 close around a portion of the tissue. The forceps 10 are next retracted proximally to tear a tissue sample from the surrounding tissue. Since the forceps 10 are automatically locked by the camming action and the connecting pin 26 and the closing force is high, the jaws 14, 16 may strongly grasp the tissue, thus maximizing the amount of tissue excised from the surrounding tissue. Next, the forceps 10, along with the tissue sample, are removed from the patient's body lumen and endoscope. The scope may then be removed as well. Alternatively, the scope and forceps 10 may be removed together. Also alternatively, the forceps 10 may be inserted without the use of a scope or through a catheter. The forceps 10 may also be positioned at the tissue sampling site with the use of other well-known imaging methods such as fluoroscopy.

Figure 12:
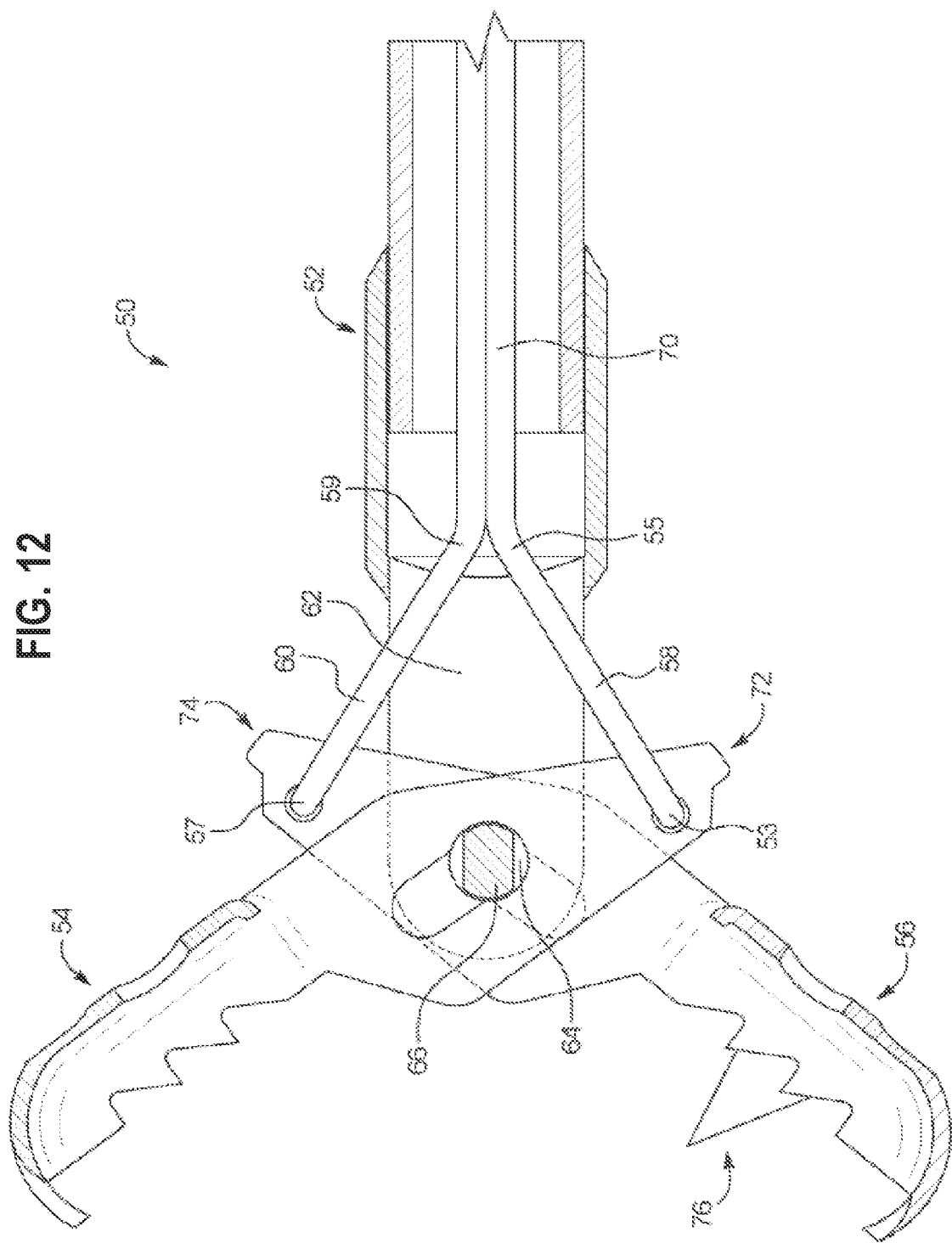
FIG. 12 is a sectional side view of another forceps design in an open configuration.
Figure 13:
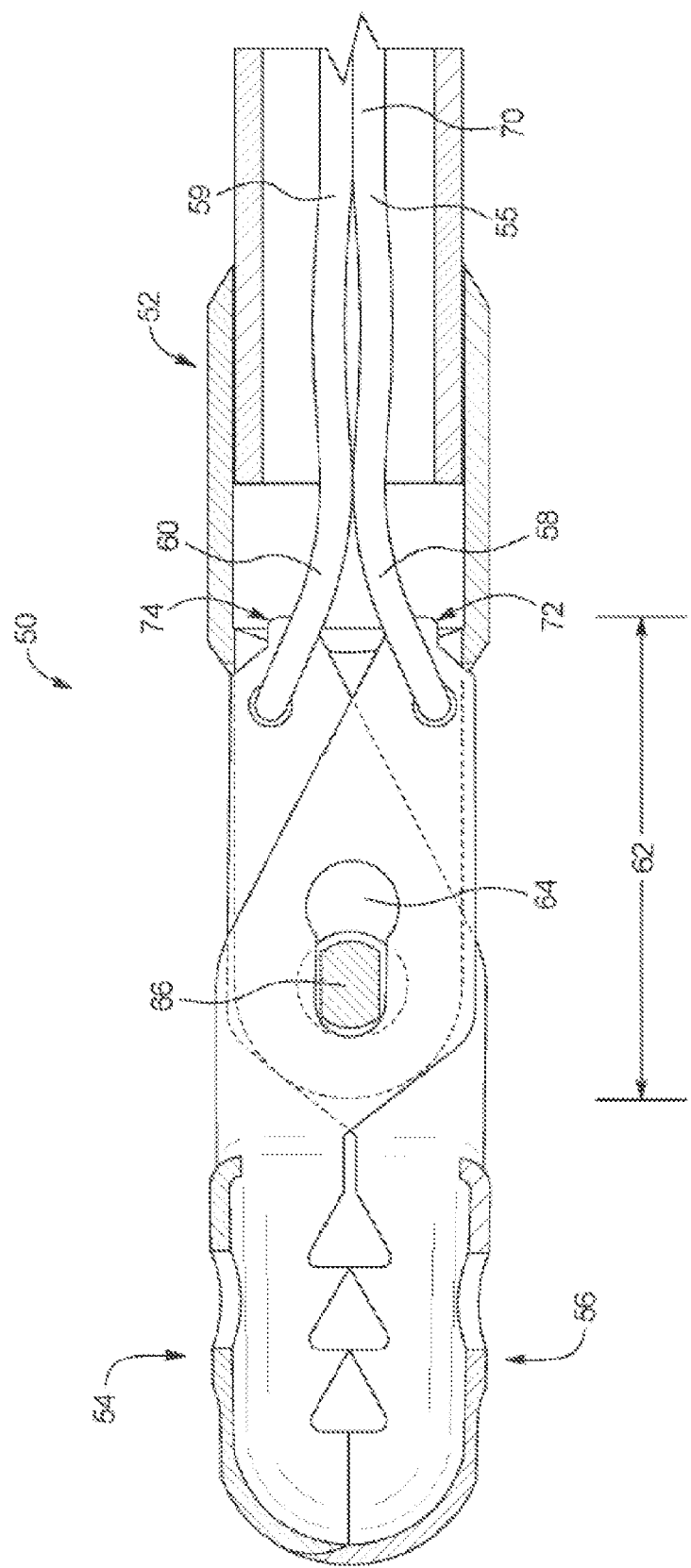
FIG. 13 is a sectional side view of another forceps design in a closed configuration.

In another embodiment of the invention a forceps 50 is provided. FIG. 12 shows the forceps 50 in an open configuration while FIG. 13 shows the forceps 50 in a closed, or locked, configuration. The forceps 50 may include a housing 52, a first jaw 54, and a second jaw 56. The forceps 50 may further include a first connection member 58 and a second connection member 60. The distal end of the housing 52 may include a forked portion 62. The first jaw 54 may include a first opening 64 and the second jaw 56 may include a second opening 65 (concentric with the first opening 64 when viewed from the side angle in FIG. 13). The first and second jaws 54, 56 may be pivotably connected to the forked portion 62 of the housing 52 by a connecting pin 66 disposed through the first and second openings 64, 65. The connecting pin 66 may be fixedly attached to the forked portion 62 of the housing 52. The first jaw 54 may be pivotably connected to one end 53 of the first connection member 58. The other end 55 of the first connection member 58 may be operably connected to a driver 70. The second jaw 56 may be pivotably connected to one end 57 of the second connection member 60. The other end 59 of the second connection member 60 may be operably connected to the driver 70. In this embodiment the first and second connection members 58, 60 extend proximally to a point to where they meet adjacent to one another. The connection members 58, 60 then extend further proximally together to form the driver 70, which ideally extends to a point external the patient during the procedure. However, the driver 70 may also have a variety of other designs, including a stiff elongated wire or shaft. The housing 52 is ideally an elongated shaft with a hollow portion through which the driver 70 is movably disposed. A portion of the housing 52, or another shaft operably connected to the housing 52, may extend to a point external the patient during operation. As with the previous embodiment, the connecting pin 66 and openings 64, 65 may be designed to allow two degrees of freedom: longitudinal and rotational movement of the jaws 14, 16.

Similar to the operation of the previously discussed embodiment, the forceps 50 may be repeatedly moved between the open configuration and closed configuration by longitudinally moving the driver 70 relative to the housing 52. To move the forceps 50 from the open configuration to the closed configuration, the driver 70 is moved proximally relative to the housing 52. As the driver 70 is moved proximally, the driver 70 pulls the first and second connection members 58, 60 proximally as well. As the first and second connection members 58, 60 move proximally, the jaws 54, 56 pivot about the connecting pin 66, which causes the jaws 54, 56 to begin to close. Eventually, further proximal movement of the driver 70 will cause the jaws 54, 56, and the openings 64, 65 in the jaws 54, 56, to slide longitudinally in a proximal direction with respect to the connecting pin 66. Finally, and possibly simultaneously, the jaws 54, 56 will slide proximally to a point where the connecting pin 66 is secured within the elongated portion of the openings 64, 65 and the jaws 54, 56 are rotated together such that the jaws 54, 56 are in contact with one another, thus reaching the closed configuration. When in the closed configuration as shown in FIG. 13, the forceps 50 may be further secured by designing the proximal ends of the jaws 54, 56 such that a portion of them are disposed within the housing 52 while the forceps 50 are in the closed configuration. Ideally, the jaws 54, 56 each have respective notches, or protrusions, 72, 74. When the connecting pin 66 is fully or partially within the cylindrical portion of the opening 64, the notches 72, 74 are outside of the housing 52, thus allowing free rotation of the jaws 54, 56 without interference from the housing 52. Once the connecting pin 66 and the jaws 54, 56 are pulled further proximally such that the connecting pin 66 is fully or partially within the elongated portion of the opening 64, the notches 72, 74 are pulled within the housing 52. Therefore, when in the closed configuration, the inner surface of the housing 52 contacts the notches 72, 74, thus limiting free rotation of the jaws 54, 56 and thereby locking them closed.

Additionally, the shape of the connecting pin 66 with respect to the elongated portion of the openings 64, 65 may limit rotational motion of the jaws 54, 56. Thus, the jaws 54, 56 are locked and unable to rotate substantially about the connecting pin 66 to the open configuration, thereby preventing or eliminating accidental release of the tissue or other item the forceps are grabbing. To move the forceps 50 back to the open configuration, the driver 70 is moved distally relative to the housing 52, reversing the closure cycle previously described.

The forceps 50 may be used in a tissue biopsy procedure in a similar manner as described with previous embodiments. The forceps 50 are moved within a body lumen to where a tissue sample is to be collected. The forceps are then moved from the open configuration to the closed configuration such that the jaws 54, 56 are closed around a piece of tissue and the forceps 50 are automatically locked shut by the mechanisms described above. While maintaining the forceps 50 in the closed configuration, the forceps 50 are pulled proximally, thus tearing the tissue sample from the surrounding tissue. The forceps 50, along with the collected tissue sample, are then removed from the patient.

The forceps 50 may be modified in various ways as described in previous embodiments including, but not limited to, modifying the shape of the jaws 54, 56 to suit various functions.

Figure 14:
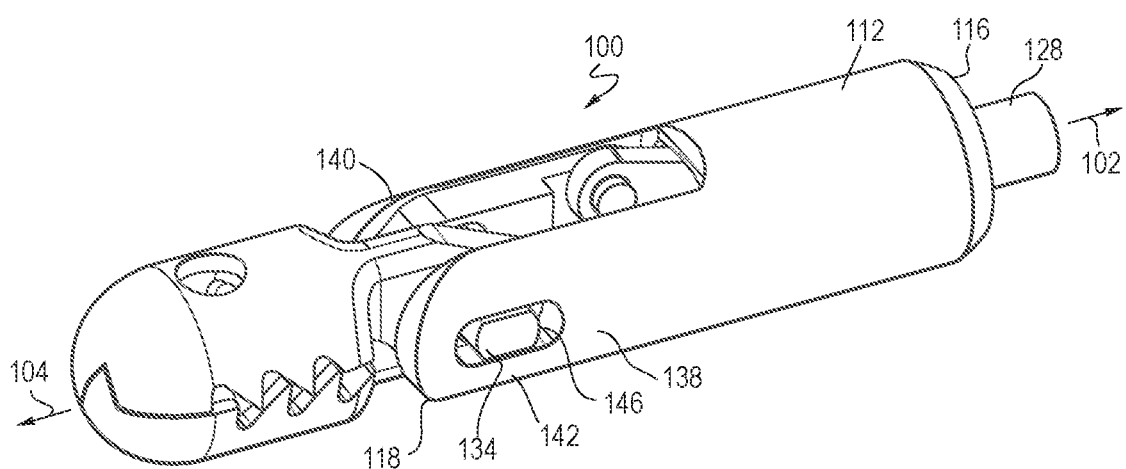
FIG. 14 is a perspective view of a first embodiment of another forceps design in a closed configuration.
Figure 15:
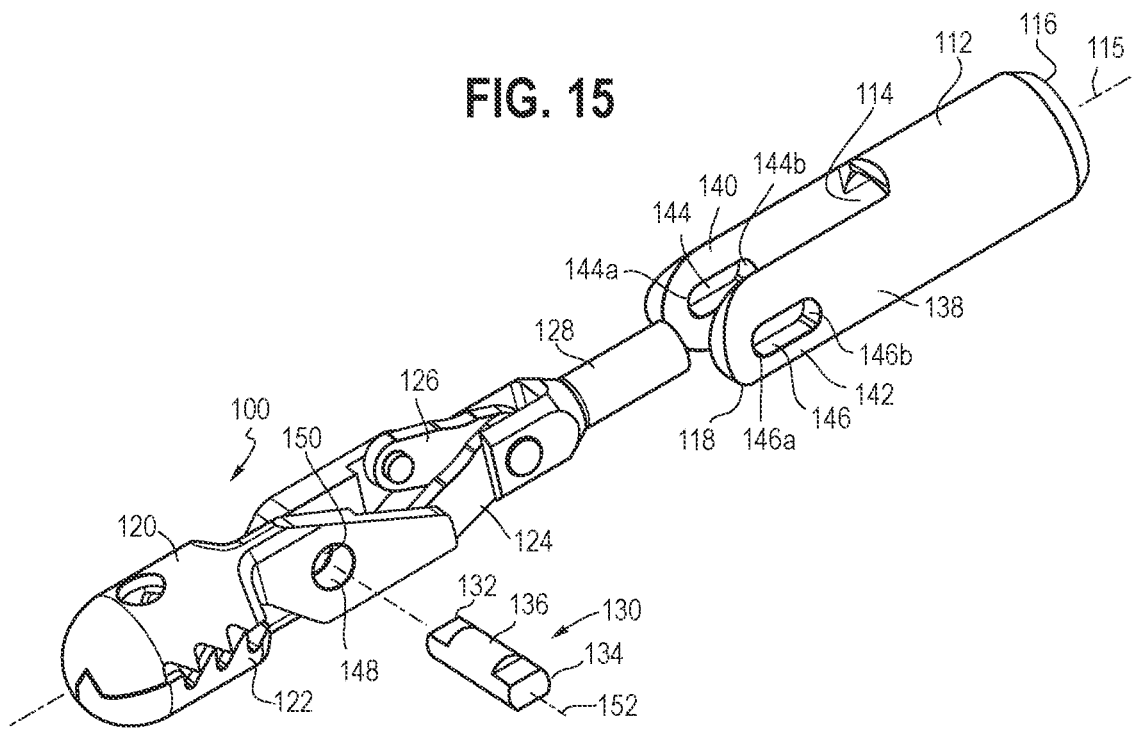
FIG. 15 is an exploded view of the forceps design of FIG. 14.

Embodiments of another forceps design 100 will be illustrated below, where features/aspects that are similar to those in the forceps designs discussed above will not be repeated for the sake of brevity. Referring to FIGS. 14, 15, and 17-19, a first embodiment of another forceps design 100 is shown. As shown, the first embodiment of the forceps design 100 includes a housing 112 defining an internal passageway 114 and a longitudinal axis 115 extending between a proximal end 116 and a distal end 118 of the housing 112. The first embodiment of the forceps design 100 also includes a first jaw 120 and a second jaw 122. The first jaw 120 is slidably and pivotably connected to the housing 112, and the second jaw 122 is slidably and pivotably connected to the housing 112, as described in greater detail below. In the first embodiment of the forceps design 100, a connecting pin assembly 130 is provided to slidably and pivotably connect the first and second jaws 120 and 122 to the housing 112. For example, as shown in FIGS. 14 and 15, the connecting pin assembly 130 slidably engages the housing 112, and the first and second jaws 120 and 122 are pivotable about the connecting pin assembly 130 (or about a longitudinal axis 152 of the connecting pin assembly 130). The first and second jaws 120 and 122 have an open configuration (e.g., as shown partially open in FIGS. 17-19) and a closed configuration (e.g., as shown in FIG. 14).

Figure 17:
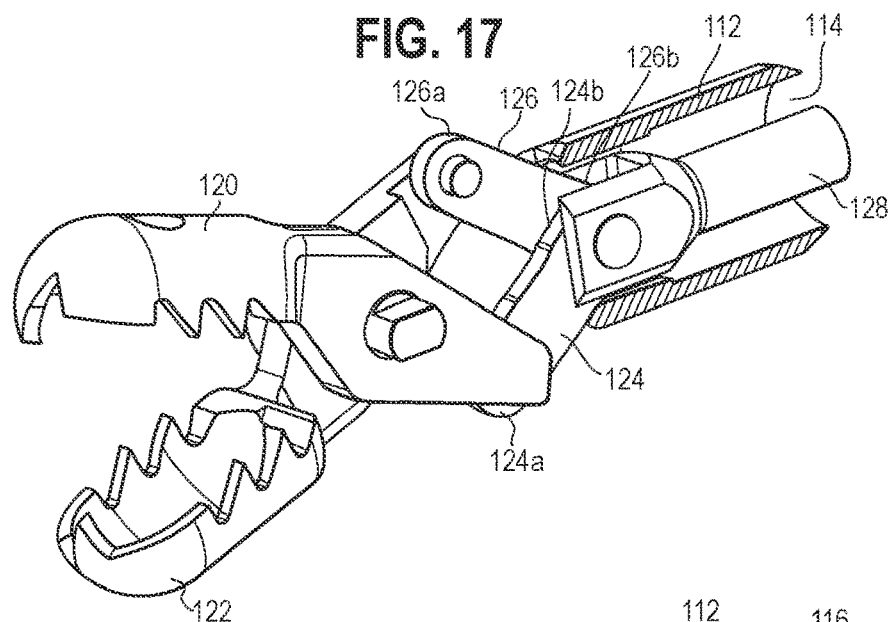
FIG. 17 is a perspective view of the forceps design of FIG. 14 in an open configuration with a portion of the housing removed and clearance visible between connection members and the housing.
Figure 19:
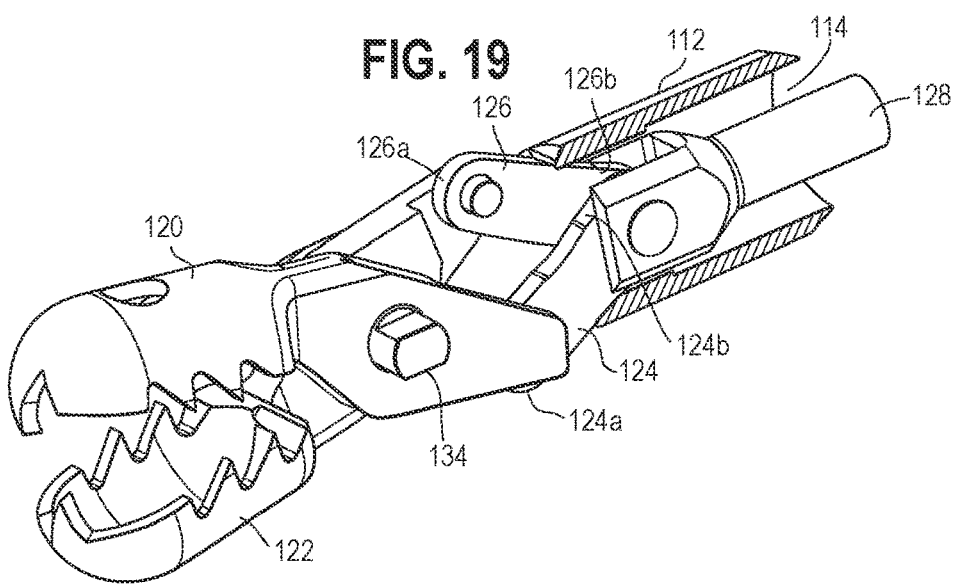
FIG. 19 is a perspective view of the forceps design of FIG. 18 with a portion of the housing removed.

The first embodiment of the forceps design 100 further includes a first connection member 124 and a second connection member 126. The first connection member 124 extends between a first end 124a and a second end 124b, and the second connection member 126 extends between a first end 126a and a second end 126b. The first end 124a of the first connection member 124 is pivotably connected to the first jaw 120 (e.g., via a pin, post, boss), and the first end 126a of the second connection member 126 is pivotably connected to the second jaw 122 (e.g., via a pin, post, boss). The first embodiment of the forceps design 100 further includes a driver 128 that is operably and pivotably connected to the second end 124b of the first connection member 124 and the second end 126b of the second connection member 126. The driver 128 may be a stiff elongated wire or shaft that ideally extends to a point external the patient during the procedure. As shown in FIGS. 15, 17, and 19, the driver 128 is movably disposed in the internal passageway 114 of the housing 112.

A longitudinal movement of the driver 128 in a proximal direction 102 relative to the housing 112 moves the first and second jaws 120 and 122, along with the connecting pin assembly 130 and the first and second connection members 124 and 126, relative to the housing 112 from the open configuration to the closed configuration, as described in greater detail below. A longitudinal movement of the driver 128 in a distal direction 104 relative to the housing 112 moves the first and second jaws 120 and 122, along with the connecting pin assembly 130 and the first and second connection members 124 and 126, relative to the housing 112 from the closed configuration to the open configuration, as described in greater detail below.

As shown in FIG. 15, the connecting pin assembly 130 extends between a first end 132 and a second end 134 along its length. The connecting pin assembly 130 includes a middle portion 136 disposed between the first end 132 and the second end 134. The first end 132 and the second end 134 of the connecting pin assembly 130 each are configured to slide along a length of the housing 112, as described in greater detail below. The middle portion 136 of the connecting pin assembly 130 is configured to rotatably connect the first jaw 120 and the second jaw 122, as described in greater detail below.

As shown in FIG. 15, the middle portion 136 of the connecting pin assembly 130 is substantially cylindrical, and the first end 132 and the second end 134 of the connecting pin assembly 130 each include opposing flats. In other words, the first and second ends 132 and 134 each has a cross-section that is elongated in shape with two flattened edges and two curved edges. Referring to FIGS. 15, 17, and 19, the first jaw 120 includes a first hole 148 and the second jaw 122 includes a second hole 150 (concentric with the first hole 148 when viewed from the side angle in FIG. 15), which are configured to receive a portion (e.g., the middle portion 136) of the connecting pin assembly 130 and allow the first jaw 120 and the second jaw 122 to pivot about a longitudinal axis 152 of the connecting pin assembly 130, thus allowing the first and second jaws 120 and 122 to be pivotably connected to the housing 112.

As shown in FIG. 15, the first and second holes 148 and 150 are substantially cylindrical to accommodate the substantially cylindrical middle portion 136 of the connecting pin assembly 130. It will be appreciated that the configuration (e.g., shape and size) of the middle portion 136 of the connecting pin assembly 130 and the configuration (e.g., shape and size) of the first and second holes 148 and 150 of the first and second jaws 120 and 122 may be varied, as desired and or needed, without departing from the scope of the present invention, as long as their configurations allow the first and second jaws 120 and 122 to pivot about the connecting pin assembly 130 or a longitudinal axis 152 of the connecting pin assembly 130. The connecting pin assembly 130 and the first and second holes 148 and 150 may be configured such that a potential sliding movement between the connecting pin assembly 130 and the first and second jaws 120 and 122 is limited to a direction along a longitudinal axis 152 of the connecting pin assembly 130.

Referring to FIGS. 14, 15, and 17-19, the distal end 118 of the housing 112 includes a forked portion 138 including a first fork 140 and a second fork 142. The first fork 140 includes a first slot 144 configured to slidably receive the first end 132 of the connecting pin assembly 130, and the second fork 142 includes a second slot 146 configured to slidably receive the second end 134 of the connecting pin assembly 130, such that movement of the first and second ends 132 and 134 of the connecting pin assembly 130 along a length of the first and second slots 144 and 146 of the forked portion 138 causes the first and second jaws 120 and 122, along with the first and second connection members 124 and 126, to move along a length of the housing 112.

Figure 18:
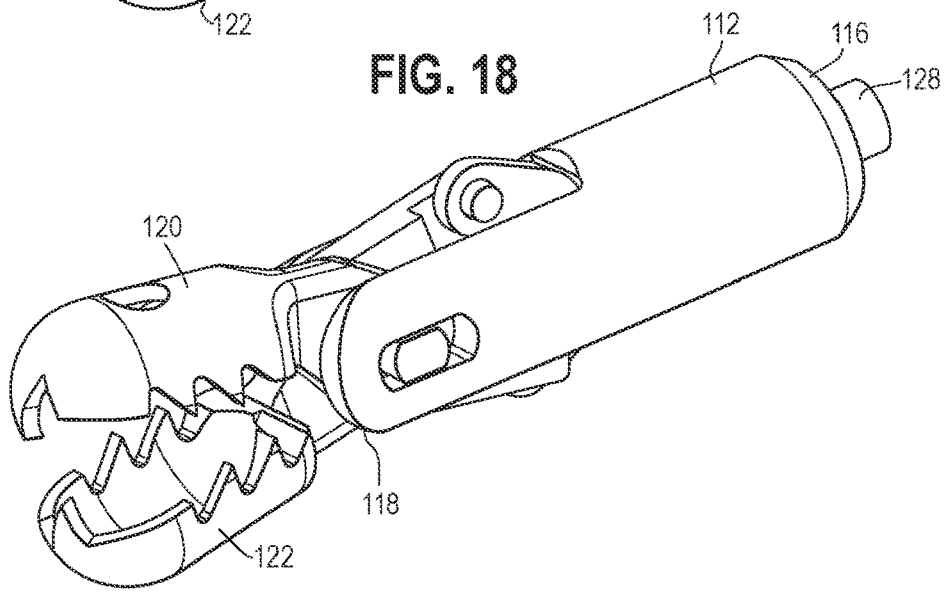
FIG. 18 is a perspective view of the forceps design of FIG. 14 in another open configuration with connection members contacting the housing.

As shown in FIGS. 14, 15, and 18, the first slot 144 and the second slot 146 each are configured to have a cross-section that is elongated in shape with two flattened edges and two curved edges. The flattened edges of the first and second slots 144 and 146 and the flattened edges of the first and second ends 132 and 134 of the connecting pin assembly 130 are advantageous for preventing significant rotation between the connecting pin assembly 130 and the housing 112. In addition, the flattened edges of the first and second slots 144 and 146 and the flattened edges of the first and second ends 132 and 134 of the connecting pin assembly 130 facilitate mechanically trapping the connecting pin assembly 130 between the first and second forks 140 and 142 of the housing 112 so that the connecting pin assembly 130 cannot slide along its longitudinal axis 152 because the substantially cylindrical middle portion 136 of the connecting pin assembly 130 is too large to fit through the first and second slots 144 and 146 in the first and second forks 140 and 142, respectively.

It will be appreciated that the configuration of the first slot 144 and the second slot 146 of the housing 112, and the first end 132 and the second end 134 of the connecting pin assembly 130 may be varied, as desired and/or needed, without departing from the scope of the present invention, as long as the first jaw 120 and the second jaw 122 may move along a length of the housing 112 via the movement of first and second ends 132 and 134 of the connecting pin assembly 130 relative to the first and second slots 144 and 146 of the housing 112, respectively.

Assembly of the first embodiment of the forceps design 100 may be achieved by flexing or bending the first and second forks 140 and 142 apart to receive the internal components of the assembly before allowing them to spring back, or bending them back, into final position. Fabrication of such an assembly via lithographic methods is also feasible, as is a method where the housing 112 is stamped and "folded" around the rest of the assembly.

Methods of moving the forceps design 100 between the open configuration and the closed configuration will be illustrated now using the first embodiment. It will be appreciated that the same/similar methods may be used for other embodiments of the forceps design 100. In use, the first and second jaws 120 and 122 may be moved in two separate degrees of freedom: rotationally and longitudinally. Specifically, the first and second jaws 120 and 122 may rotate open and closed and also slide longitudinally along the longitudinal axis 115 of the housing 112. The rotational and longitudinal movement of the first and second jaws 120 and 122 does not always occur in discrete and separate stages of operation. Instead, due to the shape of the connecting pin assembly 130 and the first and second holes 148 and 150, along with the actuating force of the driver 128, and the design of the first and second connection members 124 and 126 and the first and second slots 144 and 146, the first and second jaws 120 and 122 open and close via a blended motion where the rotational and longitudinal movements of the first and second jaws 120 and 122 may occur simultaneously during certain stages of the closure cycle.

FIG. 17 shows the first and second jaws 120 and 122 are in a partially open configuration. In a partially or fully open configuration, the first and second ends 132 and 134 of the connecting pin assembly 130 each may be disposed at or near distal ends 144a and 146a of the first and second slots 144 and 146 of the forked portion 138 of the housing 112. To move the first and second jaws 120 and 122 to the closed configuration, the driver 128 is moved proximally with respect to the housing 112. As the driver 128 is moved proximally, the second ends 124b and 126b of the first and second connection members 124 and 126 are correspondingly pulled in the proximal direction 102, while the first ends 124a and 126a of the first and second connection members 124 and 126 are pulled in the proximal direction 102 while also being rotated towards each other. As the first and second connection members 124 and 126 move proximally while also partly rotating towards each other, the first and second jaws 120 and 122 each pivot about the connecting pin assembly 130 (or pivot about the longitudinal axis of the connecting pin assembly (e.g., in the fourth embodiment of the forceps design 100 described below)), which causes the first and second jaws 120 and 122 to begin to close.

The first and second jaws 120 and 122 may begin to slide proximally via the connecting pin assembly 130 along the first and second slots 144 and 146 of the forked portion 138 in the housing 112 as the first and second jaws 120 and 122 continue to rotate closed. In this embodiment, translation (e.g., longitudinal movement along the longitudinal axis 115 of the housing 112) of the first and second jaws 120 and 122, along with the connecting pin assembly 130, relative to the housing 112 is not constrained by the connection between the connecting pin assembly 130 and the first and second jaws 120 and 122. In other words, translation of the first and second jaws 120 and 122 is not limited to after the first and second jaws 120 and 122 rotate about the connecting pin assembly 130 (or a longitudinal axis of the connecting pin assembly) a certain angle. It will be appreciated that, after the driver 128 is moved proximally, in some embodiments, the first and second jaws 120 and 122 may slide proximally first before they rotate to close, while in other embodiments, the first and second jaws 120 and 122 may rotate to close first before they slide proximally, while in other embodiments, the first and second jaws 120 and 122 may rotate to close and slide proximally simultaneously.

As the driver 128 continues to move in the proximal direction 102, the first and second connection members 124 and 126 may eventually contact the housing 112, as shown in FIGS. 18 and 19. Once the first and second connection members 124 and 126 contact the housing 112, they may remain in contact as the first and second jaws 120 and 122 continue to be moved to the closed configuration. Additionally, a camming action occurs when contact is made between the housing 112 and the first and second connection members 124 and 126. This camming action gives the present design a mechanical advantage over traditional forceps, which utilize a simple scissor-like closing motion and do not have a high closing force near the end of the closing motion. After contact is made between the first and second connection members 124 and 126 and the housing 112, further proximal movement of the driver 128 causes the first and second jaws 120 and 122 to continue to close as the camming action is maintained. The camming action creates a force by the housing 112 against the first and second connection members 124 and 126, which provides a corresponding increasing force against the first and second jaws 120 and 122 that urges the first and second jaws 120 and 122 towards the closed configuration. This improves the performance of forceps designs by enhancing the force of closure and reducing the tendency for tissue to slip-out during "tear-off." This is particularly useful for very small forceps where the average diagnostic yield can be quite low due to small samples and/or "dry" samples (e.g., with no tissue at all). In addition, with the camming action provided by the forceps design, less medical waste may be created due to fewer procedures being needed and/or devices being required in order to get adequate diagnostic yield.

Similar to the embodiment of the forceps 10, discussed above, translation of the first and second jaws 120 and 122 and the connecting pin assembly 130 along the longitudinal axis 115 of the housing 112 may undergo one or more reversals of direction during the movement cycle from open to closed and vice-versa. For example, during movement from open to closed, the first and second jaws 120 and 122 may initially undergo proximal translation up until the point where the first and second connection members 124 and 126 contact the housing 112. At that point, continued proximal movement of the driver 128 creates a camming (or rocking) motion of the connection members 124 and 126 about their contact points with the housing 112 such that some small distalward translation of the first and second jaws 120 and 122 may occur before reversing once again and resuming proximal translation into a final closed configuration.

Referring to FIG. 14, in the closed configuration, the first and second ends 132 and 134 of the connecting pin assembly 130 each may be disposed at or near proximal ends 144b and 146b of the first and second slots 144 and 146 of the forked portion 138 of the housing 112. Once the first and second jaws 120 and 122 are in the closed configuration, the first and second connection members 124 and 126 are at least partially wedged within the housing 112. The wedging of the first and second connection members 124 and 126 and the aforementioned camming action locks the first and second jaws 120 and 122 closed and prevents the first and second jaws 120 and 122 from being easily or accidentally reopened and thus potentially losing their grip on the object being grabbed. To move the first and second jaws 120 and 122 back to the open configuration, the driver 128 is moved distally relative to the housing 112, thus reversing the closure cycle previously described. The first and second jaws 120 and 122 may be moved repeatedly between the open and closed configurations.

Figure 16:
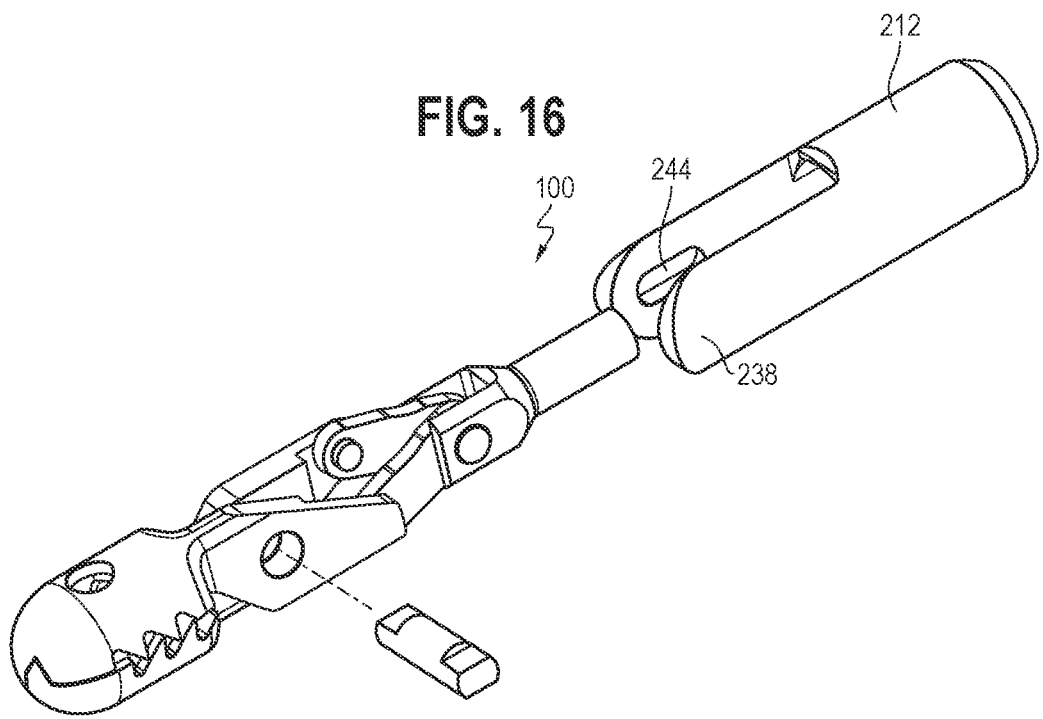
FIG. 16 is an exploded view of a second embodiment of another forceps design in a closed configuration.

Other embodiments of the forceps design 100 will be illustrated below, where features/aspects that are similar to those in the first embodiment of the forceps design 100 will not be repeated for the sake of brevity. Referring to FIG. 16, where a second embodiment of the forceps design 100 is shown. As shown in FIG. 15, the first and second slots 144 and 146 of the forked portion 138 are through slots. The only difference between the first embodiment and the second embodiment of the forceps design 100 is that the slots (e.g., slot 244) in the forked portion 238 of the housing 212 in the second embodiment are non-through slots. It will be appreciated that the first and second slots of the forked portion of the housing in any embodiment of the forceps design 100 may both be through slots, both be non-through slots, or one be through slot and the other one be non-through slot, as desired and/or needed, without departing from the scope of the present invention.

Referring to FIGS. 20 and 21, a third embodiment of the forceps design 100 is shown. As shown, the connecting pin assembly 330 in this embodiment is substantially cylindrical along its length, and thus the first and second slots 344 and 346 in the forked portion 338 of the housing 312 are configured to accommodate the first and second ends 332 and 334 of the connecting pin assembly 330 such that the connecting pin assembly 330 can slide along a length of the first and second slots 344 and 346 of the forked portion 338, which causes the first and second jaws 320 and 322, along with the first and second connection members 324 and 326, to move along a length of the housing 312.

One advantage that the third embodiment of the forceps design 100 offers is that it may be assembled in a more traditional fashion, i.e., where the connecting pin assembly 330 is placed last, after the other components of the assembly are in position. In this embodiment, some means of preventing the connecting pin assembly 330 from sliding along its longitudinal axis 352 may be provided. For example, the connecting pin assembly 330 may be configured with a diameter that creates an interference fit with at least one of the first and second holes 348 and 350 of the first and second jaws 320 and 322, requiring the connecting pin assembly 330 to be driven or pressed into place during assembly. As another example, a wider, counter-sunk (from the exterior) portion of each of the first and second slots 344 and 346 in the forked portion 338 of the housing 312 may be provided to receive a first larger head on the first end 332 of the connecting pin assembly 330 and a second larger head on the opposite second end 334 of the connecting pin assembly 330, respectively, which are swaged or otherwise formed after final assembly. As another example, the connecting pin assembly 330 may be crossed drilled to lock it to one of the first and second jaws 320 and 322 after assembly with another, smaller pin, or screw. As another example, the connecting pin assembly 330 may be formed monolithically as a part of one of the first and second jaws 320 and 322 via lithographic forming techniques.

Figure 22:
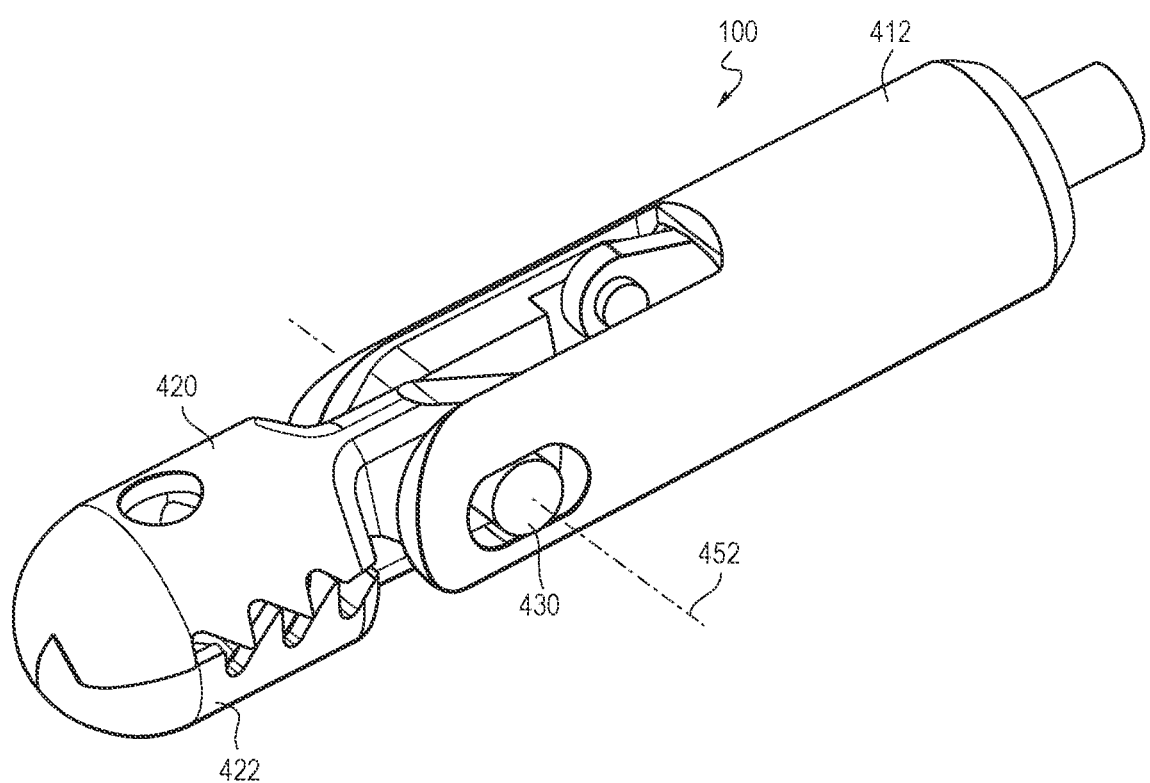
FIG. 22 is a perspective view of a fourth embodiment of another forceps design in a closed configuration.
Figure 23:
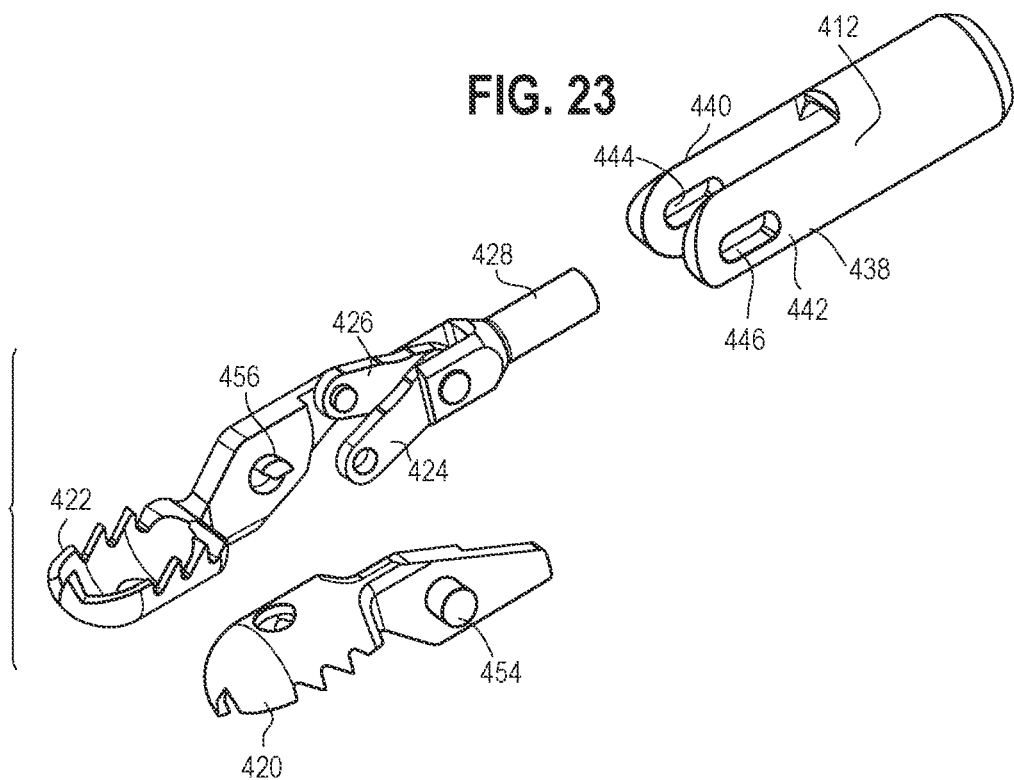
FIG. 23 is an exploded view of the forceps design of FIG. 22.

Referring to FIGS. 22-27, a fourth embodiment of the forceps design 100 is shown. As shown in FIG. 22, the fourth embodiment appears externally similar to the third embodiment discussed above (as shown in FIG. 20). In the fourth embodiment of the forceps design 100, as shown in FIG. 23, the connecting pin assembly 430 includes a first half-pin 454 associated with the first jaw 420 and a second half-pin 456 associated with the second jaw 422. The first and second half-pins 454 and 456 each are formed as a part of, or otherwise affixed to, the first and second jaws 420 and 422, respectively.

Figure 24:
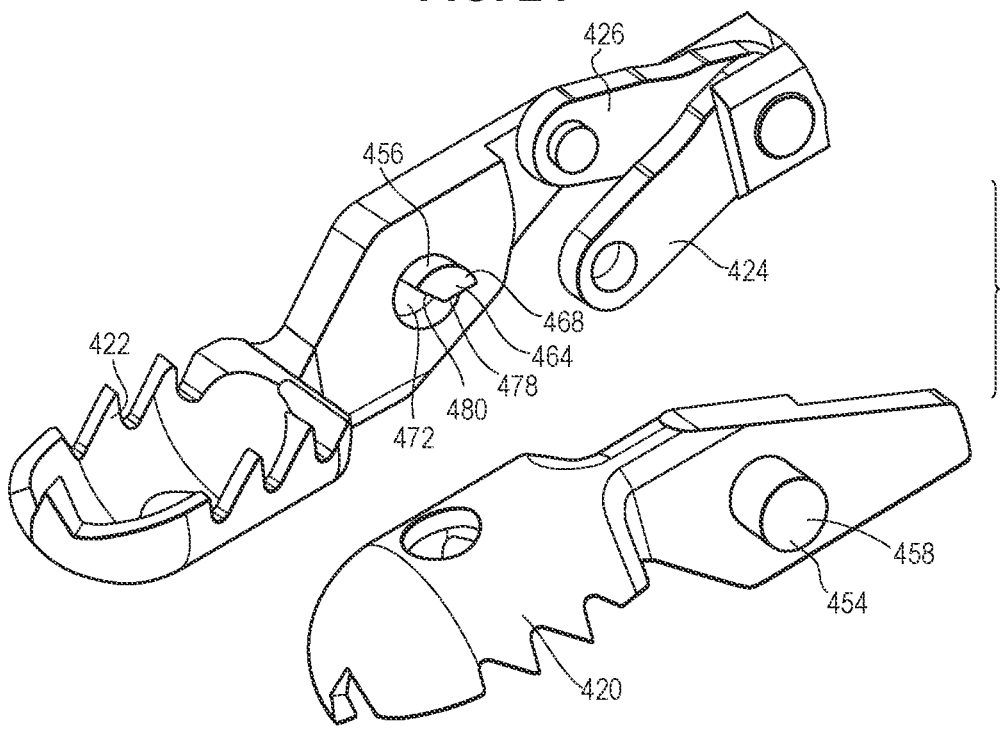
FIG. 24 is an enlarged perspective view of a first jaw and a second jaw of the forceps design of FIG. 22.
Figure 25:
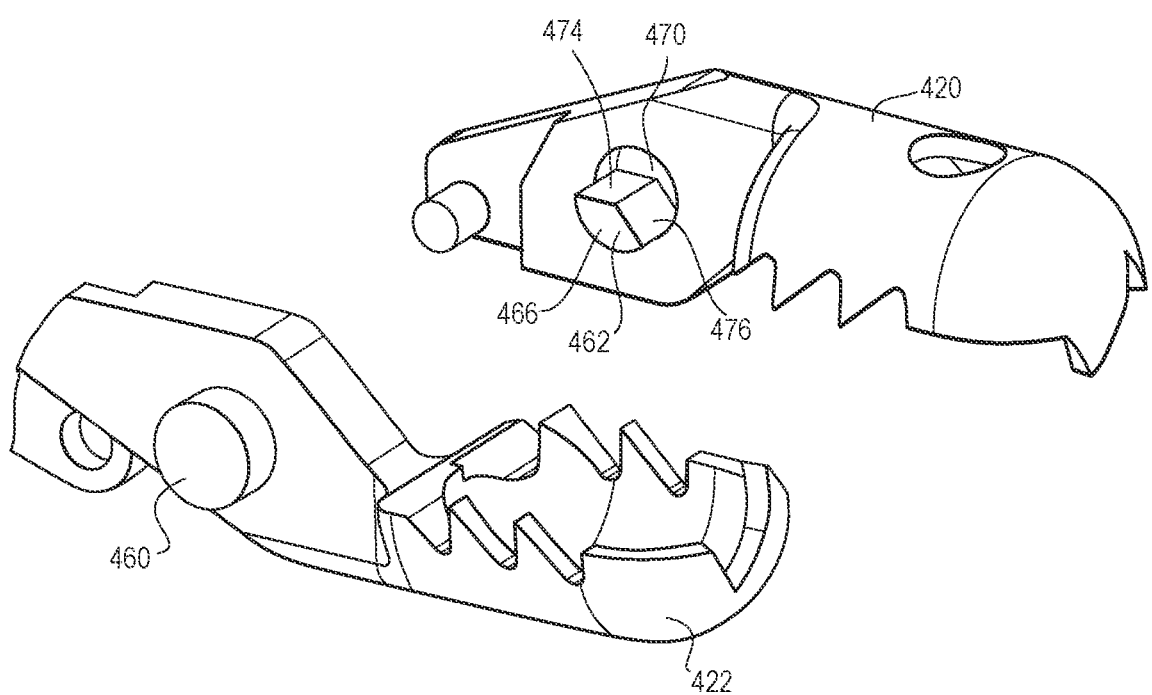
FIG. 25 is another enlarged perspective view of the first jaw and the second jaw of the forceps design of FIG. 22.

As shown in FIGS. 24 and 25, the first half-pin 454 and the second half-pin 456 each include an outboard portion and an inboard portion. The outboard portion 458 of the first half-pin 454 and the outboard portion 460 of the second half-pin 456 each are configured to slide along a length of the housing 412 (e.g., along a length of the second and first slots 446 and 444 in the second and first forks 442 and 440 of the forked portion 438) in a similar manner as described above with respect to other embodiments of the forceps design 100.

Referring to FIGS. 24-27, the inboard portion 462 of the first half-pin 454 and the inboard portion 464 of the second half-pin 456 face and interact with one another. The inboard portion 462 of the first half-pin 454 includes a first protruding section 466 and a first recessed section 470, and the inboard portion 464 of the second half-pin 456 includes a second protruding section 468 and a second recessed section 472. When the first and second jaws 420 and 422 are assembled, the first protruding section 466 fits within the second recessed section 472 and the second protruding section 468 fits within the first recessed section 470, such that relative motion between the first jaw 420 and the second jaw 422 is restricted to rotation about common axes of the first half-pin 454 and the second half-pin 456 (e.g., the common axes constitute a longitudinal axis 452 (e.g., as shown in FIG. 22) of the connecting pin assembly 430 when the first and second jaws 420 and 422 are assembled).

Figure 26:
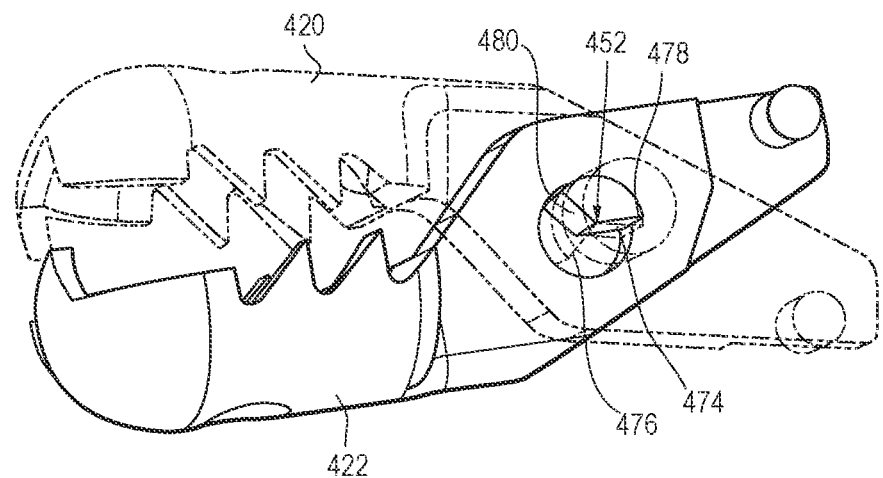
FIG. 26 is another enlarged perspective view of the first jaw and the second jaw of the forceps design of FIG. 22, showing the first and second jaws nearly closed.
Figure 27:
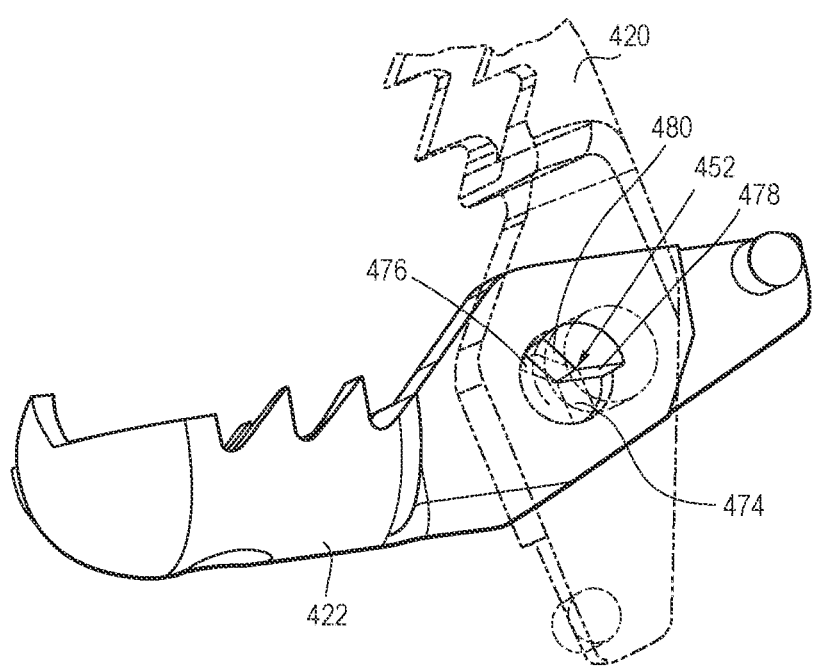
FIG. 27 is another enlarged perspective view of the first jaw and the second jaw of the forceps design of FIG. 22, showing the first and second jaws open.

As shown in FIGS. 24 and 25, the outboard portion 458 of the first half-pin 454 and the outboard portion 460 of the second half-pin 456 each are cylindrical, where the first protruding section 466 and the second protruding section 468 each are pie-shaped cylinders that include flat surfaces 474, 476, 478, and 480 that lie within radial planes of the outboard portions 458, 460 of the first half-pin 454 and the second half-pin 456, respectively. Referring to FIGS. 26 and 27, a first pair of adjacent flat surfaces 476 and 480 of the first protruding section 466 and the second protruding section 468 is configured to abut one another to limit opening of the first jaw 420 and the second jaw 422, and a second pair of adjacent flat surfaces 474 and 478 of the first protruding section 466 and the second protruding section 468 is configured to abut one another to limit closing of the first jaw 420 and the second jaw 422, as described in greater detail below.

As shown in FIGS. 26 and 27, the first jaw 420 is shown in wireframe so that the relationship of the mating pairs of open- or close-limiting surfaces on the respective half-pins can be seen in relation to one another. As shown in FIG. 26, in the position illustrated (first and second jaws 420 and 422 nearly closed), the close-limiting surfaces 474 and 478 are only a few degrees apart whilst the open-limiting surfaces 476 and 480 are separated by an angle of about 90 degrees. As shown in FIG. 27, in the position illustrated (first and second jaws 420 and 422 are open) the close-limiting surfaces 474 and 478 are separated by an angle of about 90 degrees whilst the open-limiting surfaces 476 and 480 are only a few degrees apart.

A subassembly of a half-pin and a jaw, according to the fourth embodiment described above, may be formed via lithographic techniques, sintering/powder-metallurgy, and/or by fabricating the half-pin and the jaw separately and then assembling them using known techniques such as: interference fit, welding, or cross-drill & pin or screw. Once such subassemblies are made, a complete forceps design according to the fourth embodiment and its subvariants may be assembled via one or more of the methods described previously.

Four embodiments of the forceps design 100 are described above with various corresponding embodiments of the components (e.g., the connecting pin assembly, the first and second slots of the forked portion in the housing). One of ordinary skill in the art, with a thorough review of the subject specification and figures, would readily comprehend how the various embodiments of the components may be used in other embodiments of the forceps design 100 and how to use the other embodiments of the forceps design without undue experimentation. For example, the slots in the housing in any of the four embodiments may be modified to through-slots or non-through slots, as desired and/or needed, without departing from the scope of the present invention.

While in the embodiments discussed above, the forceps are shown and described as biopsy forceps, the shape and structure of the forceps may take many forms and serve many purposes and functions, all in accordance with the teachings of the present invention. This includes the use of the forceps locking/camming design in a non-medical context.

While various embodiments of the present disclosure have been described, the present disclosure is not to be restricted except in light of the attached claims and their equivalents. One skilled in the relevant art will recognize that numerous variations and modifications may be made to the embodiments described above without departing from the scope of the present invention, as defined by the appended claims. Moreover, the advantages described herein are not necessarily the only advantages of the present disclosure and it is not necessarily expected that every embodiment of the present disclosure will achieve all of the advantages described.

I claim:

1. A forceps, comprising:
a housing defining an internal passageway and a longitudinal axis extending between proximal and distal ends of the housing;
a first jaw slidably and pivotably connected to the housing;
a second jaw slidably and pivotably connected to the housing, wherein the first and second jaws have an open configuration and a closed configuration;
a first connection member having a first end pivotably connected to the first jaw;
a second connection member having a first end pivotably connected to the second jaw;
a connecting pin assembly that slidably and pivotably connects the first and second jaws to the housing; and
a driver operably connected to a second end of the first connection member and a second end of the second connection member,
wherein longitudinal movement of the driver in a proximal direction relative to the housing moves the first and second jaws, along with the connecting pin assembly, relative to the housing from the open configuration to the closed configuration,
wherein longitudinal movement of the driver in a distal direction relative to the housing moves the first and second jaws, along with the connecting pin assembly, relative to the housing from the closed configuration to the open configuration,
wherein the connecting pin assembly extends between a first end and a second end along its length, wherein the connecting pin assembly includes a middle portion disposed between the first end and the second end, wherein the first end and the second end of the connecting pin assembly each include opposing flats,
wherein the housing comprises a forked portion including two forks, and wherein the two forks each include a slot having a cross-section that is elongated in shape with two flattened edges,
wherein the two flattened edges of each fork are configured to slidably receive the opposing flats of the first end and the second end of the connecting pin assembly, respectively, and
wherein the opposing flats are configured to slide along a length of the flattened edges.

2. The forceps of claim 1, wherein translation of the first and second jaws, along with the connecting pin assembly, relative to the housing is not constrained by the connection between the connecting pin assembly and the first and second jaws.

3. The forceps of claim 1, wherein the middle portion of the connecting pin assembly is configured to rotatably connect the first jaw and the second jaw.

4. The forceps of claim 1, wherein the first jaw and the second jaw each include a hole that receives a portion of the connecting pin assembly and allows the first jaw and the second jaw to pivot about a longitudinal axis of the connecting pin assembly.

5. The forceps of claim 1, wherein the two flattened edges of each fork are configured to prevent the connecting pin assembly from sliding along a longitudinal axis of the connecting pin assembly.

6. The forceps of claim 1, wherein the slot is a through-slot or a non-through slot.

7. The forceps of claim 1, wherein the middle portion of the connecting pin assembly is cylindrical.

8. The forceps of claim 7, wherein the first jaw and the second jaw each include a cylindrical hole.

9. The forceps of claim 1, wherein the connecting pin assembly includes a first half-pin associated with the first jaw and a second half-pin associated with the second jaw, wherein the first half-pin and the second half-pin each include an outboard portion and an inboard portion, wherein the outboard portion of the first half-pin and the outboard portion of the second half-pin each are configured to slide along a length of the housing, and wherein the inboard portion of the first half-pin and the inboard portion of the second half-pin face and interact with one another.

10. The forceps of claim 9, wherein the inboard portion of the first half-pin includes a first protruding section and a first recessed section, wherein the inboard portion of the second half-pin includes a second protruding section and a second recessed section, and wherein the first protruding section fits within the second recessed section and the second protruding section fits within the first recessed section such that relative motion between the first jaw and the second jaw is restricted to rotation about common axes of the first half-pin and the second half-pin.

11. The forceps of claim 10, wherein the outboard portion of the first half-pin and the outboard portion of the second half-pin each are cylindrical, wherein the first protruding section and the second protruding section each are pie-shaped cylinders that include flat surfaces that lie within radial planes of the outboard portions of the first half-pin and the second half-pin, respectively.

12. The forceps of claim 11, wherein a first pair of adjacent flat surfaces of the first protruding section and the second protruding section is configured to abut one another to limit opening of the first jaw and the second jaw, and wherein a second pair of adjacent flat surfaces of the first protruding section and the second protruding section is configured to abut one another to limit closing of the first jaw and the second jaw.

13. A forceps, comprising:
a housing defining an internal passageway and a longitudinal axis extending between proximal and distal ends of the housing;
a first jaw slidably and pivotably connected to the housing;
a second jaw slidably and pivotably connected to the housing, wherein the first and second jaws have an open configuration and a closed configuration;
a first connection member having a first end pivotably connected to the first jaw;
a second connection member having a first end pivotably connected to the second jaw;

a connecting pin assembly that slidably and pivotably connects the first and second jaws to the housing; and a driver operably connected to a second end of the first connection member and a second end of the second connection member, wherein longitudinal movement of the driver in a proximal direction relative to the housing moves the first and second jaws, along with the connecting pin assembly, relative to the housing from the open configuration to the closed configuration, wherein translation of the first and second jaws and the connecting pin assembly relative to the housing is not constrained by the connection between the connecting pin assembly and the first and second jaws, wherein the connecting pin assembly extends between a first end and a second end along its length, wherein the connecting pin assembly includes a middle portion disposed between the first end and the second end, wherein the first end and the second end of the connecting pin assembly each are configured to slide along a length of the housing, and wherein the housing comprises a forked portion including two forks, and wherein the two forks each include a non-through slot configured to slidably receive the first end and the second end of the connecting pin assembly, respectively.

14. The forceps of claim 13, wherein the middle portion of the connecting pin assembly is configured to rotatably connect the first jaw and the second jaw.

15. The forceps of claim 13, wherein the first jaw and the second jaw each include a hole that receives a portion of the connecting pin assembly and allows the first jaw and the second jaw to pivot about a longitudinal axis of the connecting pin assembly.

16. The forceps of claim 13, wherein the non-through slot has a cross-section that is elongated in shape with two flattened edges.

17. A forceps, comprising:
a housing defining an internal passageway and a longitudinal axis extending between proximal and distal ends of the housing;
a first jaw slidably and pivotably connected to the housing;
a second jaw slidably and pivotably connected to the housing, wherein the first and second jaws have an open configuration and a closed configuration;
a first connection member having a first end pivotably connected to the first jaw;
a second connection member having a first end pivotably connected to the second jaw;
a connecting pin assembly that slidably and pivotably connects the first and second jaws to the housing; and
a driver operably connected to a second end of the first connection member and a second end of the second connection member, wherein longitudinal movement of the driver in a proximal direction relative to the housing moves the first and second jaws, along with the connecting pin assembly, relative to the housing from the open configuration to the closed configuration, wherein longitudinal movement of the driver in a distal direction relative to the housing moves the first and second jaws, along with the connecting pin assembly, relative to the housing from the closed configuration to the open configuration, wherein the connecting pin assembly extends between a first end and a second end along its length, wherein the connecting pin assembly includes a middle portion disposed between the first end and the second end, wherein the first end and the second end of the connecting pin assembly each are configured to slide along a length of the housing, and wherein the middle portion of the connecting pin assembly is configured to rotatably connect the first jaw and the second jaw, and wherein the connecting pin assembly includes a first half-pin associated with the first jaw and a second half-pin associated with the second jaw, wherein the first half-pin and the second half-pin each include an outboard portion and an inboard portion, wherein the outboard portion of the first half-pin and the outboard portion of the second half-pin each are configured to slide along a length of the housing, and wherein the inboard portion of the first half-pin and the inboard portion of the second half-pin face and interact with one another.

18. The forceps of claim 17, wherein the inboard portion of the first half-pin includes a first protruding section and a first recessed section, wherein the inboard portion of the second half-pin includes a second protruding section and a second recessed section, and wherein the first protruding section fits within the second recessed section and the second protruding section fits within the first recessed section such that relative motion between the first jaw and the second jaw is restricted to rotation about common axes of the first half-pin and the second half-pin.

19. The forceps of claim 18, wherein the outboard portion of the first half-pin and the outboard portion of the second half-pin each are cylindrical, wherein the first protruding section and the second protruding section each are pie-shaped cylinders that include flat surfaces that lie within radial planes of the outboard portions of the first half-pin and the second half-pin, respectively.

20. The forceps of claim 19, wherein a first pair of adjacent flat surfaces of the first protruding section and the second protruding section is configured to abut one another to limit opening of the first jaw and the second jaw, and wherein a second pair of adjacent flat surfaces of the first protruding section and the second protruding section is configured to abut one another to limit closing of the first jaw and the second jaw.

* * * * *